(12) United States Patent
Chen et al.

(10) Patent No.: US 10,699,316 B2
(45) Date of Patent: Jun. 30, 2020

(54) MATCHING A REQUEST FROM A USER TO A SET OF DIFFERENT USERS FOR RESPONDING TO THE REQUEST

(71) Applicant: Thumbtack, Inc., San Francisco, CA (US)

(72) Inventors: Muxing Chen, San Francisco, CA (US); Jeffrey Lock, Flushing, NY (US); Benjamin Robert Anderson, San Francisco, CA (US); Zhenyu Liu, San Jose, CA (US); Harsh Pankaj Panchal, San Mateo, CA (US); Tracy Livengood, San Francisco, CA (US)

(73) Assignee: THUMBTACK, INC., San Francisco, CA (US)

( * ) Notice: Subject to any disclaimer, the term of this patent is extended or adjusted under 35 U.S.C. 154(b) by 0 days.

(21) Appl. No.: 15/921,554

(22) Filed: Mar. 14, 2018

(65) Prior Publication Data
US 2019/0005563 A1 Jan. 3, 2019

Related U.S. Application Data

(60) Provisional application No. 62/527,874, filed on Jun. 30, 2017.

(51) Int. Cl.
*G06Q 30/00* (2012.01)
*G06Q 30/06* (2012.01)
*G06N 20/00* (2019.01)

(52) U.S. Cl.
CPC ......... *G06Q 30/0625* (2013.01); *G06N 20/00* (2019.01)

(58) Field of Classification Search
CPC ...................................... G06Q 30/06
USPC ....................................... 705/26.1
See application file for complete search history.

(56) References Cited

U.S. PATENT DOCUMENTS

| | | |
|---|---|---|
| 8,160,929 B1 | 4/2012 | Park et al. |
| 9,177,056 B2 | 11/2015 | Zappacosta et al. |
| 10,019,743 B1 * | 7/2018 | Finch ................. G06Q 30/0633 |
| 2001/0032165 A1 | 10/2001 | Friend et al. |
| 2004/0230676 A1 | 11/2004 | Spivack et al. |
| 2004/0254821 A1 | 12/2004 | Glaser |

(Continued)

OTHER PUBLICATIONS

Non-Final Office Action from U.S. Appl. No 15/921,543, dated Jul. 11, 2018, 21 pages.

(Continued)

*Primary Examiner* — Mila Airapetian
(74) *Attorney, Agent, or Firm* — Nicholson De Vos Webster & Elliott LLP

(57) ABSTRACT

A server automatically generates a response on behalf of second users to a request received from a first user. A first stage of matching is performed that includes determining which of the second users match a requested location and request type. A second stage of matching is performed for each second user that includes computing a value that quantifies a likelihood of the first user selecting that second user to fulfill the request, and determining a capacity of the second user to fulfill the request. Some of the second users are selected based at least in part on the computed value and the determined capacity of each of the second users. A response is automatically generating for each of the selected second users. The generated responses are transmitted to the first user.

24 Claims, 12 Drawing Sheets

(56) References Cited

U.S. PATENT DOCUMENTS

| | | |
|---|---|---|
| 2005/0010484 A1 | 1/2005 | Bohannon et al. |
| 2009/0112652 A1 | 4/2009 | Kelsey et al. |
| 2009/0287596 A1* | 11/2009 | Torrenegra ............ G06Q 30/06 |
| | | 705/37 |
| 2011/0131595 A1 | 6/2011 | Xue et al. |
| 2011/0137730 A1* | 6/2011 | McCarney ....... G06Q 10/06311 |
| | | 705/14.58 |
| 2013/0138475 A1* | 5/2013 | Allison ............. G06Q 30/0201 |
| | | 705/7.29 |
| 2014/0136443 A1 | 5/2014 | Kinsey et al. |
| 2015/0317582 A1 | 11/2015 | Nath et al. |
| 2016/0034995 A1 | 2/2016 | Williams et al. |
| 2017/0039890 A1 | 2/2017 | Truong et al. |
| 2017/0220966 A1* | 8/2017 | Wang ..................... G06Q 10/08 |
| 2018/0091604 A1* | 3/2018 | Yamashita ............. H04L 67/16 |
| 2018/0260787 A1 | 9/2018 | Xi |
| 2018/0365597 A1* | 12/2018 | Farrell ................... G06Q 10/02 |

OTHER PUBLICATIONS

Final Office Action from U.S. Appl. No. 15/890,287, dated Nov. 5, 2018, 18 pages.

Final Office Action from U.S. Appl. No. 15/921,543, dated Jan. 24, 2019, 24 pages.

International Search Report and Written Opinion for Application No. PCT/US2018/017290, dated Aug. 6, 2018, 12 pages.

Non-Final Office Action from U.S. Appl. No. 15/890,287, dated Apr. 1, 2019, 13 pages.

Non-Final Office Action from U.S. Appl. No. 15/890,287, dated May 23, 2018, 12 pages.

Final Office Action received for U.S. Appl. No. 15/890,287, dated Sep. 3, 2019, 14 pages.

Non-Final Office Action received for U.S. Appl. No. 15/921,543, dated Aug. 26, 2019, 28 pages.

* cited by examiner

MATCHING A REQUEST FROM A USER TO A SET OF DIFFERENT USERS FOR RESPONDING TO THE REQUEST

CROSS-REFERENCE TO RELATED APPLICATIONS

This application claims the benefit of U.S. Provisional Application No. 62/527,874, filed Jun. 30, 2017, which is hereby incorporated by reference.

TECHNICAL FIELD

Embodiments of the invention relate to the field of data processing; and more specifically, to matching a request from a user to a set of one or more different users for responding to the request.

BACKGROUND

Responses are commonly generated for responding to requests in data processing. Some responses are fully automatic and apply to all requests. For example, in the context of web servers, a request for a web page is typically responded with a response that contains the requested web page (if such a web page exists). This response is typically not customized to the individual requester.

Other types of responses are manually generated by the responder. For example, websites exist that allow potential service buyers to submit a request for a service that includes certain details of the request such as a category and a location, and the online marketplace may transmit the request to one or more service professionals that match the requested category and location, and the service professional may compose and generate a response. These responses are largely manual and can be time intensive.

Websites exist that allow potential service buyers to search for a service professional and/or to be matched with a service professional. By way of example, the potential service buyer may post a request for a service that includes certain details of the request such as a category and a location, and the online marketplace may transmit the request to all of the service professionals that match the requested category and location. However, transmitting the request to all of the service professionals (or many service professionals) does not scale with many requests and many service professionals using the online marketplace. For instance, a particular service professional may become inundated with requests, and/or many service professionals may respond to the potential buyer. Instead of transmitting the request to all of the service professionals that match the requested category and location, a simple limiting system may be used such that if the service professional did not use marketplace over a certain period of time, they would not be sent requests or would be sent a limited number of requests. However, this type of simple limiting system may have unintended consequences. For instance, if a service professional went on vacation, they may come back and find that the marketplace was not sending them requests. Also, in sending limited requests, service professionals may not be receiving the requests that they were interested in, which may cause them to stop using the online marketplace.

SUMMARY

In an embodiment, a server receives a request for a service from a first user that defines a location for the service and a category of the service. A first stage of matching is performed that includes determining a first plurality of second users that match the location and category. A second stage of matching is performed includes performing the following for each of the first plurality of second users that match the location and category: computing a first value that quantifies an attractiveness of the request to that second user, computing a second value that quantifies a likelihood of the first user selecting that second user to fulfill the request, and computing a third value based at least in part on the computed first value and the computed second value that quantifies a score for choosing that second user for responding to the request. A request for the service is transmitted to at least some of a second plurality of second users of the first plurality of second users whose computed third value exceeds a first threshold value, wherein the second plurality of second users is less than the first plurality of second users.

In an embodiment, a server automatically generates a response to a request received from a first user. The server receives response configuration information from each of a first plurality of second users, wherein the received response configuration information includes for each of the first plurality of second users, information indicating a type of request in which that second user is willing to fulfill, and information indicating a number of requests that second user can fulfill in a given period of time. The server receives the request from the first user, wherein the request includes a location where the request is to be fulfilled and a request type. The server performs a first stage of matching that includes determining a first plurality of second users that match the location and the request type. The server then performs a second stage of matching that includes, for each of the first plurality of second users that match the location and category, performing the following: computing a value that quantifies a likelihood of the first user selecting that second user to fulfill the request, determining a capacity of the second user to fulfill the request based at least in part on the number of requests that the second user can fulfill in the given period of time. The server selects a second plurality of second users based at least in part on the computed value and the determined capacity of each of the first plurality of second users, wherein the second plurality of second users is less than the first plurality of second users. The server automatically generates a response to the request for each of the selected second plurality of second users. The server transmits each generated response to the first user.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
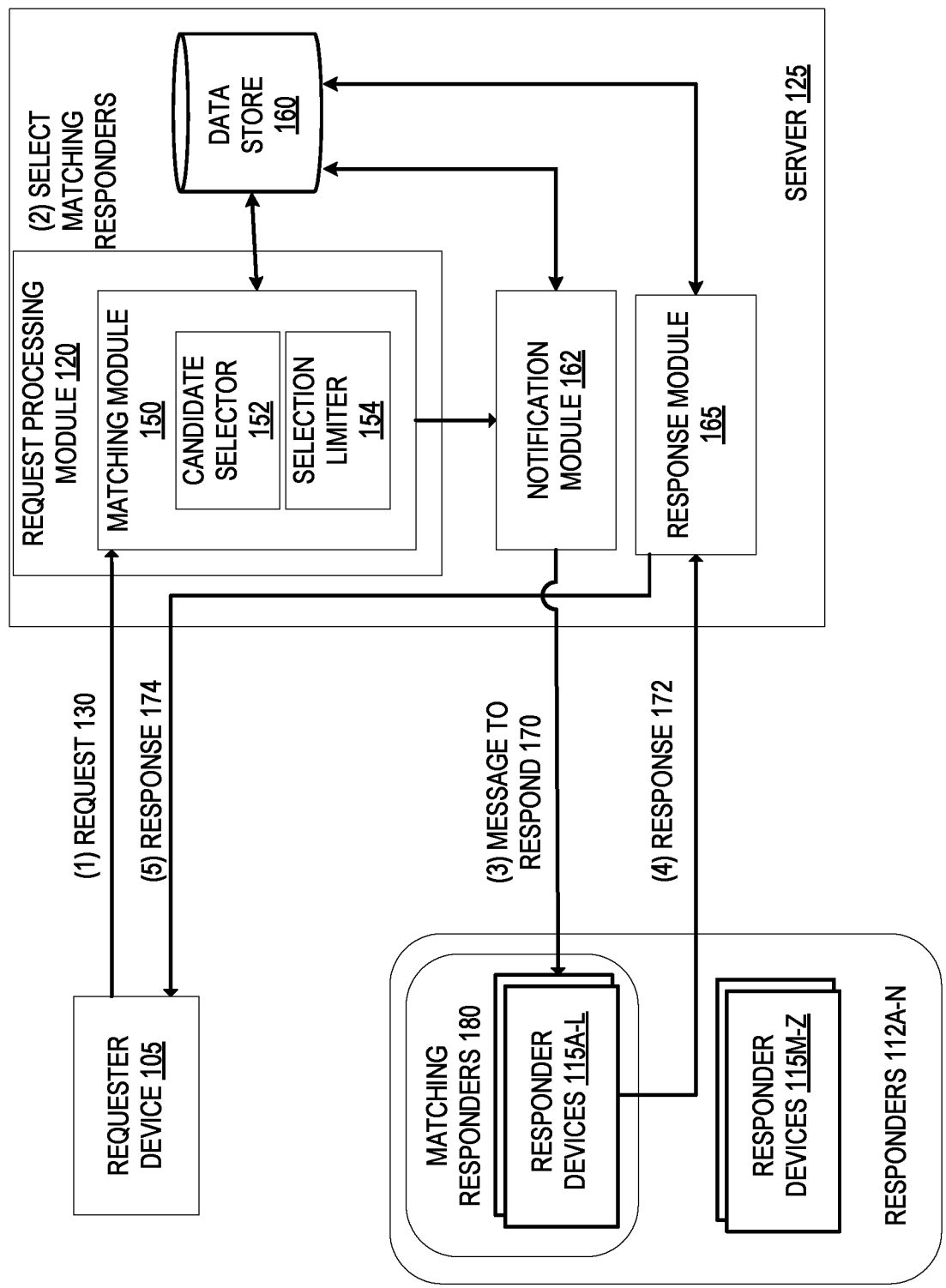
FIG. 1 is a block diagram that illustrates an exemplary architecture for an improved system for matching a request from a user to a set of one or more different users for responding to the request according to an embodiment.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In an embodiment, a method and apparatus for an improved system for matching a request from a user (sometimes referred herein as a "requester") to a set of one or more different users (sometimes referred herein as "responders") for responding to the request is described. In a specific example, the request is for a service and data from the request is used to match the request to identified responders that may be suitable for fulfilling the service request. The data in the request includes data that is structured, and may be received by the system through input of a form submitted by the requester. In an embodiment, multiple levels of matching are performed where a first level of matching retrieves a set of candidate responders and a second level of matching is performed on the set of candidate responders to select the matching responders. The first level of matching may be performed based on a set of course features based on the first set of data (e.g., based on data directly included in the first set of data and/or derived from the first set of data), and the candidate responders are those that match these features. The second level of matching may include computing a score for each candidate responder based on a scoring function and feature data. Based on the computed score, the matching responders(s) are determined.

In a specific example where the request is a service request, detailed information about the requested service is received by the system, such as through submission of a request form. Such a request form may be customized according to the category of service requested. The submission of the request form provides a relatively large set of structured data that is used when matching with responders. In such an example, the first level of matching may be performed based on a set of course features including one or more of category, location, and progress points. The request provides the category and location.

In an embodiment, the request is sent to the matching responders and/or a notification is sent to the matching responders alerting those responders that a request is available for response. The matching responders may then respond to the request. In another embodiment, a response to the request is automatically generated on behalf of the matching responders.

The one or more responders that are selected for the ability to send a response to a requester are typically selected from many more responders. In an embodiment, the selected responder(s) are selected based on multiple levels of matching where the first level of matching may be performed based on a set of course features including one or more of category, location, and progress points, and the responder(s) that match these features are referred to as candidate responders. A second level of matching may include computing a score for each candidate responder based on a scoring function and feature data, to determine which responder(s) to select. The selection may be based on machine learning models with heuristics. For instance, in an embodiment where the request is a service request, the decision of selecting which responder(s) are sent the request may be based on one or more of the following: a determined interest level of the responder in the request; a relevance of the responder to the requester; relatively short term supply and demand in the marketplace for the requested service; and relatively long term supply and demand in the marketplace for the requested service.

FIG. 1 is a block diagram that illustrates an exemplary architecture for an improved system for matching a request from a user to a set of one or more different users for responding to the request, according to an embodiment. The system 100 illustrated in FIG. 1 includes a requester device 105 that is operated by a requester, responder devices 115A-N that is each operated by a different responder of the responders 112A-N, and a server 125. The requester device 105 and the responder devices 115A-Z each are types of computing devices that interact with the server 125 and may be a desktop, laptop, smartphone, tablet, wearable device, etc., that executes a client network application. The client network application may be a web browser (e.g., a desktop browser, a mobile optimized browser), a native application, or other application that can access network resources such as web pages, images, videos, or other computer files. The requester device 105 and the responder devices 115A-Z interact with the server 125 over a network, such as the Internet.

The server 125 is a computing device that provides functionality for the improved system for matching requests with responders. In the embodiment illustrated in FIG. 1, the server 125 includes the request processing module 120, the notification module 162, the response module 165, and the data store 160.

The data store 160 stores data related to the responders and the requesters. Although illustrated in FIG. 1 as part of the server 125, the data store 160 may be in a separate computing device than the server 125 and queried by the server 125. The data store 160 is used by the server 125 (e.g., the request processing module 120, the notification module 162, and/or the response module 165) when matching a request with one or more responders that may respond to the request. For each responder, the data store 160 may store responder profile information of the responder (typically provided by the responder), and statistical information of the responder (typically derived or calculated by the server 125). The responder profile information may include, for each responder, one or more of the following: the responder's name, the category (or categories) offered by that responder, the location where the service is offered, whether the responder travels to provide the service, contact information of the responder (e.g., email address, phone number, street address) pictures of the responder and/or service, videos of the responder and/or service, service description, whether the responder has passed a background check, and whether the responder has shown proof of being licensed, etc. The statistical information of the responder may include one or more of the following: the number of times the responder has been selected to fulfill the request, the number of responses sent by, or on behalf, of that responder, the number of requests sent to that responder, the request fulfillment rate of the responder (the number of times the responder has been selected to full requests over the number of responses), the number of requests fulfilled by the responder in all categories, the rate at which the responder responds to a request or message from a requester, review(s) of the responder (typically provided by past requesters), and a rating of the responder based on the review(s). For each requester, the data store 160 may store profile information of the requester (typically provided by the requester) and/or statistical information of the requester (typically derived or calculated by the server 125). The requester profile information may include, for each requester, one or more of the following: the name of the requester, the location of the requester, and contact information of the requester (e.g., email address, phone number, street address). The statistical information of each requester may include one or more of the following: request fulfillment rate of the requester in the requested category (hires over requests), request fulfillment rate of the requester in all categories (hires over requests), and the rate at which the requester responds to a responder, review(s) of the requester (typically provided by past responders).

The request processing module 120 is configured to receive and process requests from requesters. Each request defines the parameters of what is being requested. In a specific embodiment where the request is a request for service, the request defines the type of service requested, the location where the service is desired, a category of the desired service, and one or more request preferences.

The request processing module 120 may select the responder(s) that are eligible for responding to the request. In an embodiment, the request processing module 120 selects, from multiple responders, a set of one or more responders for responding to the request as a result of a matching process performed by the matching module 150.

The matching module 150 receives a request 130 from a requester at operation 1, and matches the request with a set of one or more responders at operation 2. In the embodiment shown in FIG. 1, the matching module 150 includes the candidate selector 152 and the selection limiter 154. The candidate selector 152 performs a first level of matching based on a set of one or more course features including one or more of requested category, requested location, and progress points, to find the responder(s) that match these features. It should be understood that there may be many responders that match based on the first level of matching.

After the first level of matching is performed, the selection limiter 154 of the matching module 150 performs a second level of matching to refine which of the responder(s) that matched the first level of matching will be selected. The selection limiter 154 may perform the second level of matching based on one or more of the following: a determined interest level of the responder in the request; a relevance of the responder to the requester; relatively short term supply and demand in the marketplace for the requested job; and relatively long term supply and demand in the marketplace.

Figure 2:
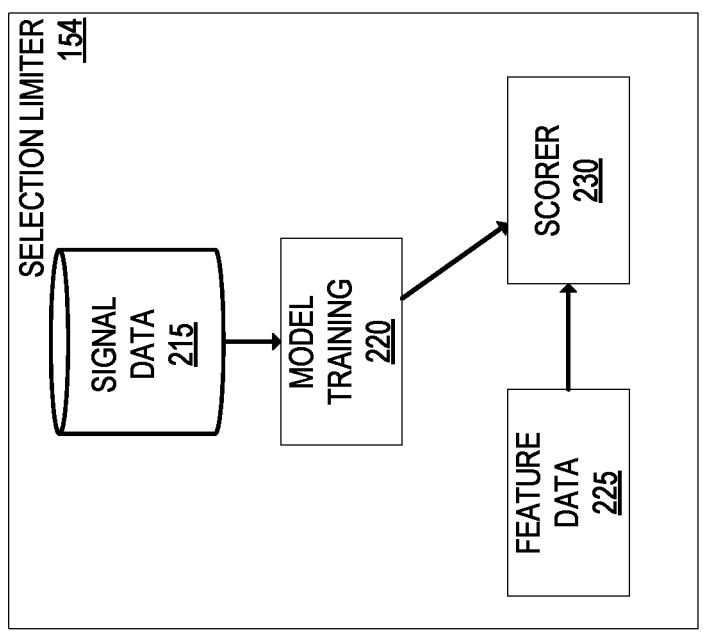
FIG. 2 is a block diagram that illustrates an embodiment of the selection limiter of FIG. 1 using a machine-learning model according to an embodiment.

The selection limiter 154 may use a machine learning model with heuristics to perform the second level of matching, such as a logistic regression model. FIG. 2 is a block diagram that illustrates an embodiment of the selection limiter 154 using a machine-learning model, according to an embodiment. The model training module 220 takes as input a set of signal data stored in the signal data store 215 and outputs a model (a scoring function) that is used by the scorer 230. The signal data 215 is created from the requests and/or other interactions with the system such as historical information from the responders. The signal data 215 may be a subset of the data store 160 and/or may be derived from data of the data store 160. The signals used by the model training module 220 depends on the model that is being trained. Example signals for different models are described later herein. The scorer 230 calculates a score based on the feature data 225. The feature data 225 is a subset of the data store 160 and may include features derived from the request and/or historical behavior of the responders, and depends on the type of model being used.

The responder(s) that remain after the second level matching are added to a response submission list and the notification module 162 transmits a message to respond 170 to the request 130 to each of these responder(s), at operation 3. The message to respond 170 to the request 130 may include the information of the request 130. The message to respond 170 may be a notification alerting the responder that the request 130 is available on the system for the responder to respond. The selection limiter 154 may include responder(s) that match the first level of matching and have recently registered for the system (e.g., within a predefined period of time such as 30 days) and/or have recently begun offering service for the requested category in the requested location (e.g., within the predefined period of time) in the response submission list regardless of the second level of matching. In the example shown in FIG. 1, the responders 180 that operate the responder devices 115A-L have been determined to match the request. More details regarding the second level of matching will be described in greater detail later herein. In the example shown in FIG. 1, the notification module 162 transmits a message to respond 170 to the request 130 to each of the responder devices 115A-L. The message to respond 170 may include the request 130 or a notification that the request 130 may be viewed. The message to respond 170 may be sent through an email, text message, and/or a notification for a native application installed on the responder devices 115A-L. The message to respond may also be capable of being displayed to the responder upon logging into the service (e.g., in a dashboard for the responder).

If any of the matching responders 180 decides to respond to the message (and thus to the request 130 such as providing a response), the responder uses the response module 165 to generate a response 172, at operation 4. The response provides information that allows the requester to determine whether to proceed with selecting that responder to fulfill the request. For instance, the response may include information including one or more of the following: the name of the responder, contact information of the responder (e.g., phone number, email address, social network username, etc.), a description of the qualifications of the responder, information about the price the responder estimates the requested service will cost, and other information that the responder wants to provide. At operation 5, the response 174 (which may correspond with the response 172) is transmitted from the server 125 to the requester device 105. The total number of unique responses sent to the requester device 105 is less than or equal to the number of messages to respond that are sent to the matching responders 180. Although not illustrated in FIG. 1, the requester device 105 may respond to the response in any number of ways, such as asking for more information, hiring a responder, etc.

Figure 3:
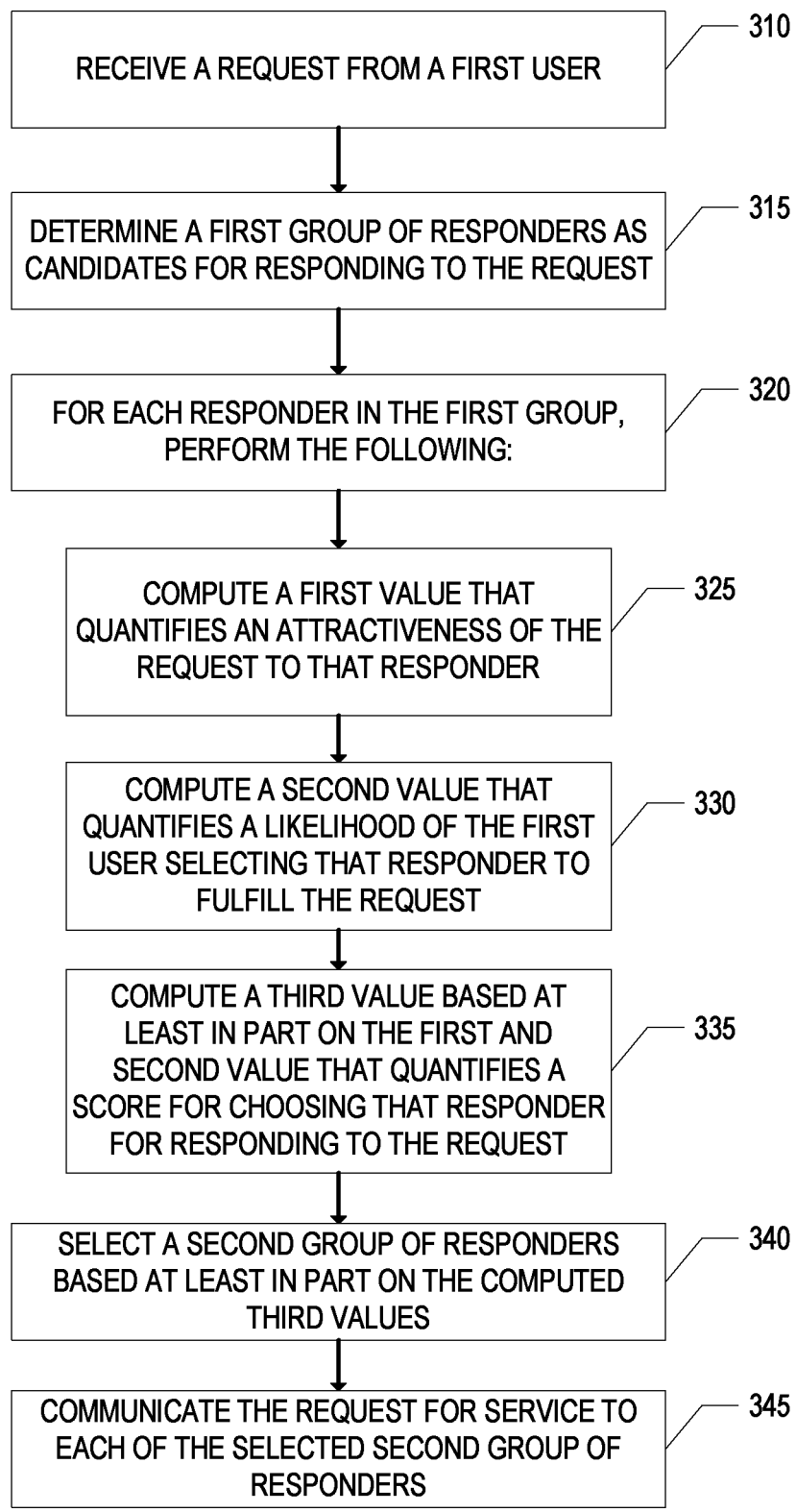
FIG. 3 is a flow diagram that illustrates exemplary operations for matching a request from a user to a set of one or more different users for responding to the request according to an embodiment.

FIG. 3 is a flow diagram that illustrates exemplary operations for matching a request from a user to a set of one or more different users for responding to the request according to an embodiment. The operations of FIG. 3 will be described with respect to the exemplary embodiment of FIG. 1. However, the operations of FIG. 3 can be performed by different embodiments than those discussed with FIG. 1, and the exemplary embodiment of FIG. 1 can perform different embodiments than those discussed with respect to FIG. 3.

At operation 310, the request processing module 120 of the server 125 receives a request 130 from a first user. The request may be a request for service and define parameters for the requested service. For instance, the request may specify a specify a location where the service is desired and a category of the desired service. Typically, the location indicates where the requester is located and/or how far the requester is willing to travel for the requested service. The location may be entered as a city, a street within a city, a zip code, etc. The category of service indicates the type of service that is desired. There may be many different categories that can be selected and/or input by the requester. As an example, French Lessons may be a category. As another example, Interior Design may be a category. The request may also include information about the requested service, dependent upon the category, that may be used by the system to match the requester with the responders. This information is sometimes referred herein as request preferences. For instance, if the category is Interior Design, the request may specify what room(s) (e.g., kitchen, living room, bedroom, dining room, commercial or office space, etc.) are desired to be improved, which can be used to match to responders that specialize in those rooms (some designers may specialize in kitchen remodels, for example). As another example, if the category is French Lessons, the request may specify the age (or age range) of the person that wants to improve or learn French that can be used to match to responders (some providers offering French Lessons may not be adapted to teach young children, for example). Flow then moves to operation 315.

After receiving the request, the matching module 150 of the server 125 performs a first level of matching to select a first group of second users for potentially responding to the request. The second users may be referred herein as responders. In an embodiment where the request includes a requested location and indicates a request category, the first group of responders match at least the requested location and category. The first level of matching may also be based on information provided in the request about the requested service. Thus, at operation 315, the candidate selector 152 of the matching module 150 determines a first group of responders as candidates for responding to the request. In the case where the request is a request for service and the request includes a requested location and category, the candidate selector 152 determines the first group of responders to be those that match the requested location and category. The first group of responders are sometimes referred herein as candidate responders. The candidate selector 152 access information about the responders such as the location(s) that they offer service and the category(ies) of service that they offer, from the data store 160. The candidate selector 152 compares the requested location and category with the information from the data store 160 to select the candidate responders. In a specific example, the first level of matching includes determining the responders that have the same zip code as the requested location and/or within a predefined number of miles/kilometers from the requested location, and offer service in the same category as the request category. Depending on the location and/or category, there may be many candidate responders. Flow moves from operation 315 to operation 320.

After determining the candidate responders, the matching module 150 of the server 125 performs a second level of matching to refine which responders are selected. In an embodiment, the second level of matching is intended to determine which set of responders are best suited for fulfilling the request, and may take the following factors into consideration: the requester's requirements included in the request, the responder's express intent and derived interest in fulfilling the request, the qualification of the responder for fulfilling the request, whether the responder is a good fit for the request (e.g., for request for services involving personal preferences or style, such as interior design jobs), whether the request is a good fit for the responder and is likely to deliver value to the responder's business, and/or the overall long term supply and demand in the marketplace being balanced between requester needs and available responders. At operation 320, the selection limiter 154 of the matching module 150 performs operations 325-335 for each responder in the first group of responders (the candidate responders).

At operation 325, the selection limiter 154 computes a first value that quantifies an attractiveness of the request to that responder. The attractiveness of the request may be a prediction of whether the responder will respond to the request. The response may include providing more information to the requester that allows the requester to determine whether to select that responder to fulfill the request. The computation of the first value may be based on data representing the historical behavior of the candidate responders and using logistic regression. For instance, one of the ways to measure how likely a responder would be interested in the request is to determine whether, and what extent, the responder has previously engaged to similar requests. Determining a similar request may include matching the request by category (e.g., the same category), location (e.g., the same location and/or location within a predefined area), and request preferences (e.g., text description, requester features, question-answers, etc.). By way of example, the logistic regression model used by the selection limiter 154 may use one or more signals derived from data of the system that is stored in the data store 160. For instance, the data store 160 may store engagement data for each responder that maps category and location (e.g., category, zip code) to: the number of requests sent to that responder, the number of requests sent to that responder that were viewed, the number of responses sent by or on behalf of that responder, and/or the number of times in which the responder was selected to fulfill requests. The engagement data stored in the data store 160 for each responder may indicate one or more of the following: the number of viewed requests by the responder in the request category, the concentration of the number of viewed requests by the responder in the request category compared to the number of total number of viewed requests by the responder in all categories, the rate at which the responder views requests in the requested category (the number of viewed requests by the responder in the request category over the number of requests sent to the responder in the request category), the number of responses sent by or on behalf of the responder in the request category, the concentration of the number of responses sent by or on behalf of the responder in the request category compared to the total number of responses sent by or on behalf of the responder in all categories, the rate at which responses are sent by or on behalf of the responder in the request category compared to the number of requests sent to the responder in the request category, the number of times the responder was selected to fulfill the request in the request category, the concentration of the number of times the responder was selected to fulfill the request in the request category compared to the number of overall times the responder was selected to fulfill requests in all categories, and the rate at which the responder was selected to fulfill the request in the request category over requests matched to the responder (the number of times the responder was selected to fulfill the request in the request category over the number of times the responder was sent a request for the requested category.

The data store 160 may also store physical distance features including the distance between the requested location (e.g., zip code) and all locations where the service has been responded to before and may also be weighted by the responses concentration in the requested location. Another physical distance feature is the centroid distance, which is calculated as the distance between the request location and the centroid of locations where the category of service has been responded to previously. In a specific example, equation 1 may be used to determine a weighted distance between the requested location and all location where the service has been responded to previously:

$$\sum_{zip\,code} D(\text{request zip code, zip code}) * \frac{\text{Quotes in the zip code}}{\text{Total Quotes}} \quad \text{equation (1)}$$

The engagement data may be weighted based on time. For instance, a response from a year ago may not have the same value of a response a week ago. In an embodiment, the engagement data is weighted more heavily in recent time windows than engagement data occurring in later time windows. The time windows may be based on days (e.g., one day), weeks (e.g., one week), and/or months (e.g., one month). In another embodiment, a decayed value is used to weigh the engagement data based on time. For instance, the decayed value may be defined as a class of an initial value N, timestamp t0, and half-life L. N is exponentially decayed. After L, the value of N becomes N/2. The value of N at any future time t can then be calculated as $N*2^{-(t-t_0)/L}$). Multiple decayed values may be added if they have the same half-life value (e.g., $(N_1, t_1), (N_2, t_2)$). The new timestamp is t=max $(t_1, t_2)$ and the new value (assuming that $t_1>=t_2$) is $N_2*2^{-(t-t_0)/L}+N_1$. In a specific example, the half-life value L is set as two weeks, and as a result a response will be counted as 0.5 after 2 weeks, 0.25 after 4 weeks, etc. The half-life value may be set differently for different purposes.

Flow moves from operation 325 to 330, where the selection limiter 154 computes a second value that quantifies a likelihood of the requester selecting that responder to fulfill the request. The computation of the second value may be based on the estimated quality of the responders to the requester and may use a logistic regression model. By way of example, the logistic regression model may use one or more signals derived from data of the system including reviews of the responders, non-review related profile features, response time of the responders, previous request fulfillment rate of the responders, distance between the requested location and the responder, and/or non-responder-specific features.

Through an empirical data analysis, the number of reviews of a responder is correlated with the request fulfillment rate of the responder. Similarly, the rating of the reviews is also correlated with the request fulfillment rate of the responder. To say it another way, responders that have a relatively large number of reviews and are rated relatively high tend to be selected to fulfill requests at a higher rate than responders with a relatively low number of reviews and/or low rating. Moreover, the number of and rating of verified reviews (those that have been verified as coming from a requester that selected the responder to fulfill the request) may correlate with the request fulfillment rate of the responder.

Non-review related profile features of the responder may be correlated with the request fulfillment rate of the responder, such as the existence of a profile picture, the number of profile pictures, the number of videos, profile completion status, the number of times the responder has been selected to fulfill a request, the length of the service description, whether the responder has passed a background check, and/or whether the responder shows proof of being licensed. For instance, responders with profile picture(s) may have a larger request fulfillment rate than those responders that do not have profile picture(s). Also, the number of pictures can have a correlation with request fulfillment rate. For instance, the request fulfillment rate of responders tends to go up until about 5 pictures where the request fulfillment rate levels off. The number of videos of a responder may be correlated with the request fulfillment rate of the responder depending on the category of service provided. Whether a responder has passed a background check may impact request fulfillment rate depending on the service category. For example, responders that have passed a background check may have a larger request fulfillment rate in service categories that concern children (e.g., babysitting, tutoring, music lessons, etc.). Responders that have evidence of being licensed may have a higher request fulfillment rate than other responders in certain categories (e.g., wellness, personal, pets).

The response time of a responder is correlated with the request fulfillment rate. For instance, how quickly the responder responds to an invitation to response (and thus respond more quickly to a request), and/or how quickly a responder responds to messages or questions from a requester impacts the request fulfillment rate. That is, responders that respond more quickly have a higher request fulfillment rate than other responders. The response time may be weighed more heavily in recent time windows and/or only viewed in a certain time window. For instance, the average response time in the past year (or other predefined time period) may be used.

The previous request fulfillment rate is generally correlated with the current request fulfillment rate. That is, the request fulfillment rate of responders for a request category generally tends to stay roughly linear. The number of previous times a responder has been selected to fulfill a request over a given time period (e.g., over the last year) may be used.

The distance between the requested location and the responder may impact request fulfillment rate. For instance, request fulfillment rate for a responder generally goes down as distance increases. This value may be dependent on whether the requester travels to the responder for the requested service, whether the responder travels to the requester for the requested service, or whether the requested service is done remotely. In cases where the requester travels to the responder for the requested service, the request fulfillment rate may generally go down as distance increases. In cases where the responder travels to the requester for the requested service, the request fulfillment rate may generally go down as distance increases, but generally not as much as if the requester travelled to the responder. In cases where the requested service may be done remotely, the distance between the requested location and the responder may not impact the request fulfillment rate.

Non-responder-specific features such as the historical request fulfillment rate in the category (across all responders) is generally the same as the expected request fulfillment rate in the category.

Figure 4:
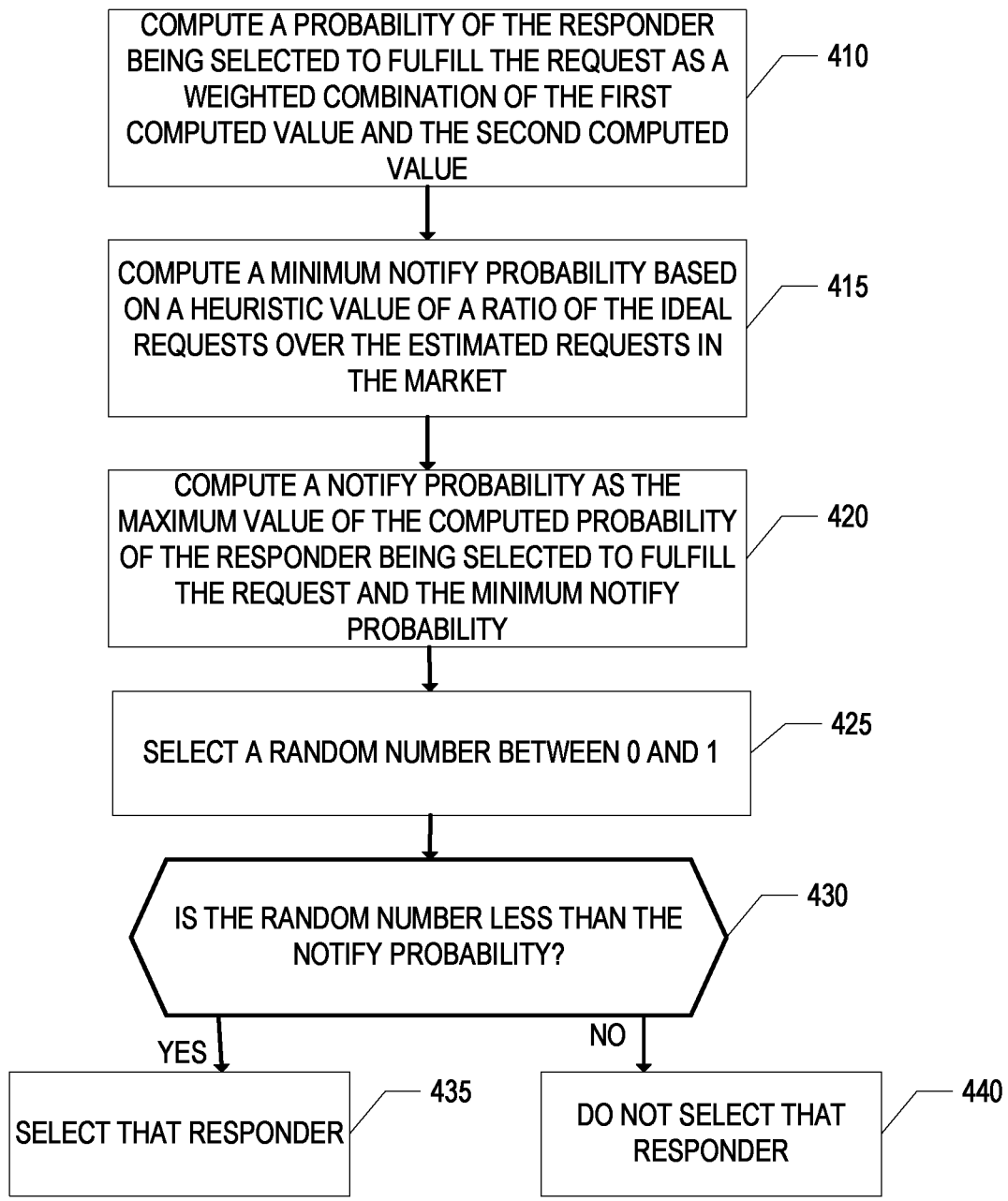
FIG. 4 is a flow diagram that illustrates exemplary operations for computing the third value of FIG. 3 according to an embodiment.

Flow moves from operation 330 to 335, where the selection limiter 154 computes a third value based at least in part on the computed first value and the computed second value that quantifies a score for choosing that responder for responding to the request. FIG. 4 is a flow diagram that illustrates exemplary operations for computing the third value according to an embodiment. At operation 410, the selection limiter 154 computes a probability of the responder being selected to fulfill the request as a weighted combination of the first computed value and the second computed value (e.g., probability of being selected to fulfill the request=$w_1$*first computed value+$w_2$*second computed value). The weights $w_1$ and $w_2$ may be determined through training of a machine learning model against historical data on fulfillments.

Next, at operation 415, the selection limiter 154 computes a minimum notify probability based on a heuristic value of a ratio of the ideal requests over the estimated requests in the market. In a specific implementation, the minimum notify probability is computed as the ideal requests per week divided by the estimated requests in the market per week.

Next, at operation 420, the selection limiter 154 computes a notify probability as the maximum value of the computed probability of the responder being selected to fulfill the request (as found in operation 410) and the minimum notify probability (as found in operation 415). In a specific implementation, the computed notify probability will be a number in the range between 0 and 1.

Next, at operation 425, a random number is selected between 0 and 1. Then, flow moves to operation 430 where the selection limiter 154 determines whether the random number (as found in operation 425) is less than the computed notify probability (as found in operation 420). If the random number is smaller than the notify probability, then flow moves to operation 435 where that responder is selected for responding to the request. If the random number is larger than the notify probability, then flow moves to operation 440 where that responder is not selected for responding to the request.

Figure 5:
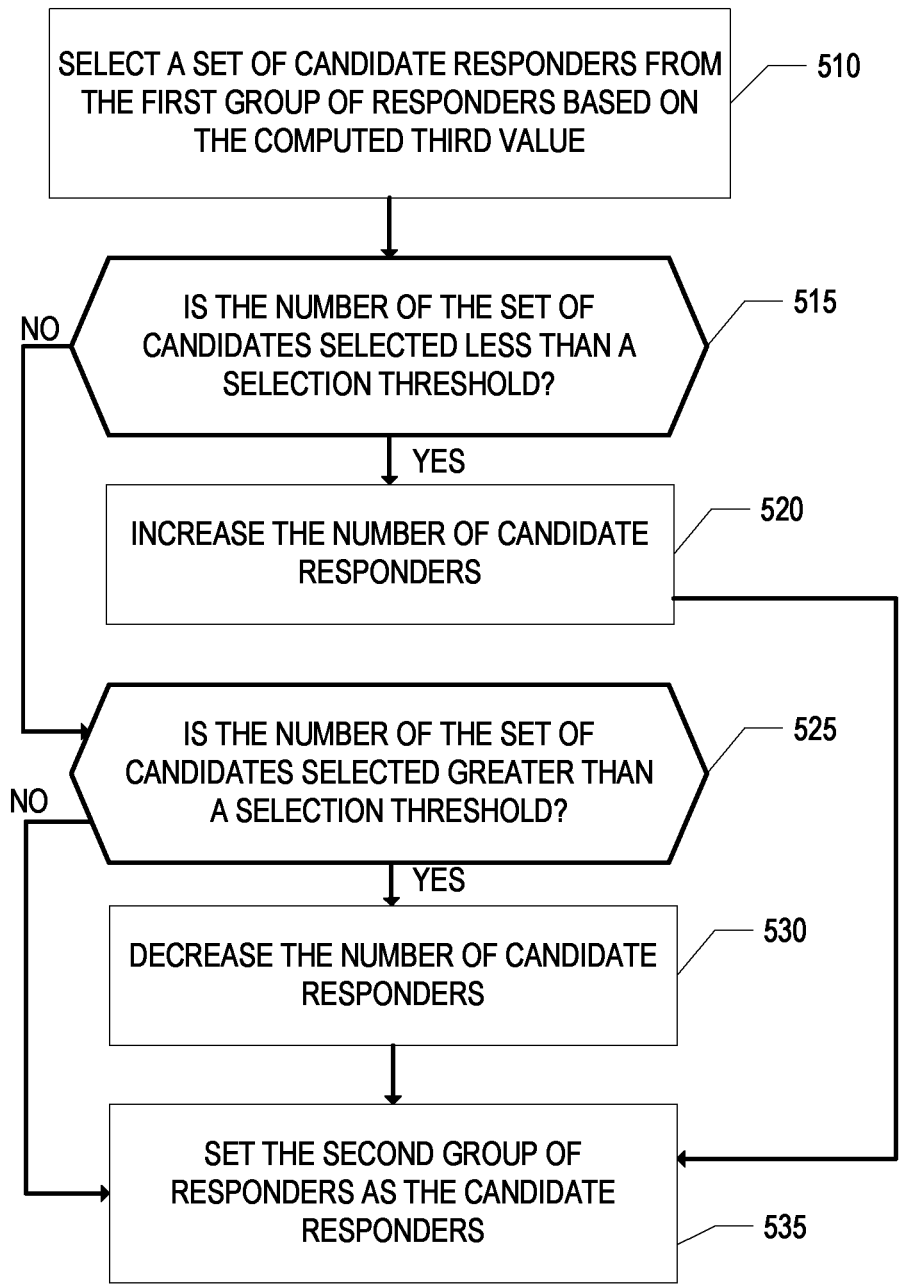
FIG. 5 is a flow diagram that illustrates exemplary operations for selecting the second group of responders of FIG. 3 according to an embodiment.

Referring to FIG. 3, flow moves from operation 335 to operation 340, where the selection limiter 154 selects a second group of responders based at least in part on the computed third values. In an embodiment, the second group of responders are those that have the highest computed third values until a threshold number of responders are selected. In an embodiment, the selected second group of responders is adjusted for market supply and demand. For instance, in markets where there are few responders that are selected to respond to the request, the number of selected responders is increased, and in markets where there are many responders that are eligible for selection, the number of selected responders is decreased. FIG. 5 is a flow diagram that illustrates exemplary operations for selecting the second group of responders according to an embodiment. At operation 510, the selection limiter 154 selects a set of candidate responders from the first group of responders based on the computed value. By way of example, the selected set of candidate responders are those that are selected through the operations described with respect to FIG. 4. In another example, the selected set of candidate responders are those whose computed third value is above a predefined threshold. Next, at operation 515, the selection limiter 154 determine whether the number of the set of candidates selected is less than a selection threshold. The value of the selection threshold is based on heuristic analysis and may depend on the service category.

If the number of the set of candidates selected is less than the selection threshold, then flow moves to operation 520 where the number of candidate responders is increased until the selection threshold is reached. In an embodiment, these additional candidate responders that are selected are based on the computed first values until the selection threshold is reached (those responders that were not initially selected that have a higher computed first value than other responders that were not initially selected). In another embodiment, these additional candidate responders that are selected are based on the computed third values until the selection threshold is reached (those responders that were not initially selected that have a higher computed third value than other responders that were not initially selected). Flow moves from operation 520 to operation 535 where the second group of responders is set as the candidate responders.

If the number of the set of candidates selected is not less than a selection threshold, then flow moves to operation 525 where the selection limiter 154 determines whether the number of the set of candidates selected is greater than a selection threshold. In an embodiment, the value of the selection threshold used in operation 515 is less than the value of the selection threshold used in operation 525. In another embodiment, the value of the selection threshold used in operation 515 is the same as the value of the selection threshold used in operation 525. If the number of the set of candidates selected is greater than the selection threshold, then flow moves from operation 525 to operation 530 where the number of candidate responders is decreased until the threshold is reached. In an embodiment, the responders that are de-selected is based on the computed first values until the selection threshold is reached. For example, those candidate responders that have the lowest computed first value as compared to other candidate responders are de-selected until the selection threshold is reached. In another embodiment, the responders that are de-selected is based on the computed third values until the selection threshold is reached. For example, those candidate responders that have the lowest computed third value as compared to other candidate responders are de-selected until the selection threshold is reached. Flow moves from operation 530 to operation 535. Referring to operation 525, if the number of the set of candidates selected is not greater than the selection threshold, then flow moves to operation 535.

Figure 6:
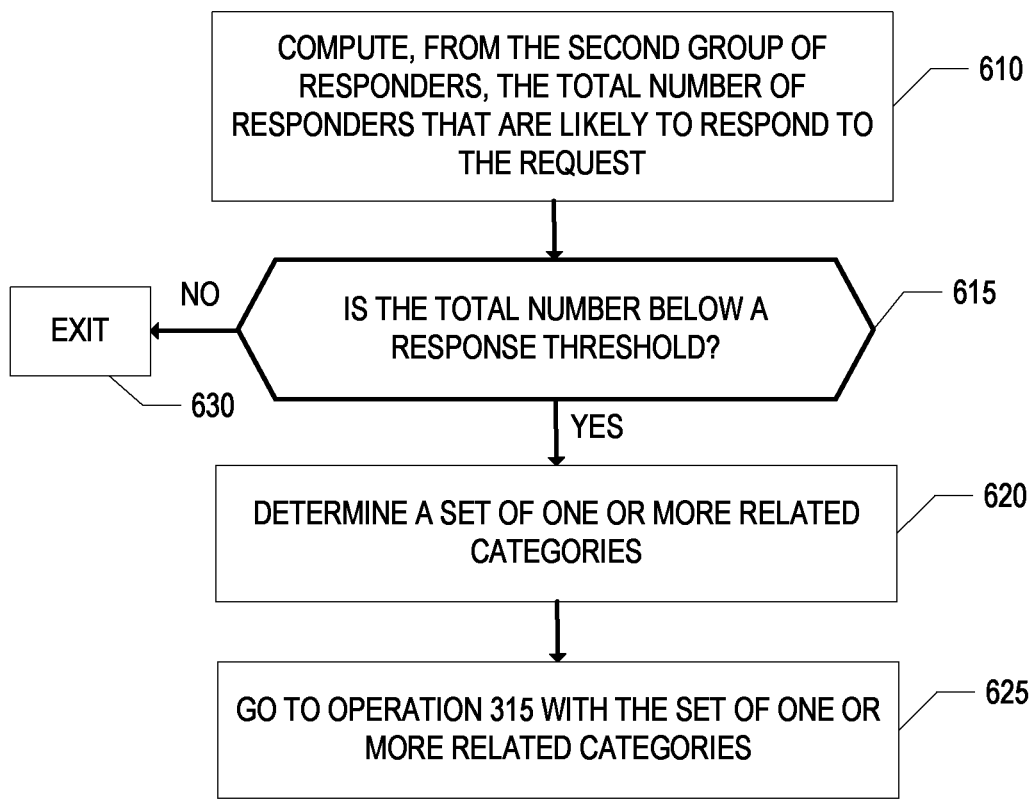
FIG. 6 is a flow diagram that illustrates exemplary operations for increasing the number of matching responders according to an embodiment.

As previously described, at operation 535 the second group of responders is set as the candidate responders. However, prior to this operation, the operations of FIG. 6 may be performed in an embodiment. FIG. 6 is a flow diagram that illustrates exemplary operations for increasing the number of matching responders according to an embodiment. The operations of FIG. 6 may be performed, for example, if the number of matched responders is below a threshold. This may occur, for example, if the requested category is not serviced by many responders. This may also occur if it is determined that there are not many responders that are likely to respond to the request.

At operation 610, the selection limiter 154 computes, from the second group of responders, the total number of responders that are likely to respond to the request. By way of a specific example, the selection limiter 154 computes the total number of expected responses for the request based on each responders likelihood to submit a response for the current request. For instance, based on the computed first value described in operation 325, the selection limiter 154 determines whether it is likely that the responder will submit a response for the current request. In a specific example, if the computed first value is greater than 0.5, the selection limiter 154 determines that it is likely that the responder will submit a response for the current request. Next, at operation 615, the selection limiter 154 determines whether the total number is below a response threshold. In an embodiment, the response threshold is based on a bottom percentile (e.g., bottom $20^{th}$ percentile) of requests by the ratio of responses over request. If the total number is below the response threshold, then flow moves to operation 620. If the total number is not below the response threshold, then flow moves to operation 630 where the operations of FIG. 6 end.

At operation 620, the selection limiter 154 determines a set of one or more related categories to the requested category. The selection limiter 154 may select the set of one or more related categories based on a memory-based collaborative filtering algorithm and optionally tuned with manual boosts. In an embodiment, the memory-based collaborative filtering algorithm uses historical data to determine the extent to which responders historically submit a response for a set of one or more other categories in addition to the requested category. If, based on the historical data, the number or rate of responders submitting a response for the requested category and another category exceeds a threshold, then that another category is a related category, according to an embodiment. If there are multiple related categories, the related categories that are selected may have the most overlap of requests to the requested category. For manual boosts, the memory-based collaborative filtering algorithm may be manually adjusted based on empirical data analysis of what categories should be related. For instance, if the algorithm suggests a "Handyman" category is related to a "Play Equipment Construction" category, it might be excluded or demoted since it may not be reasonably related.

Next, at operation 625, the operations starting back at operation 315 are performed using the set of one or more related categories.

Figure 7:
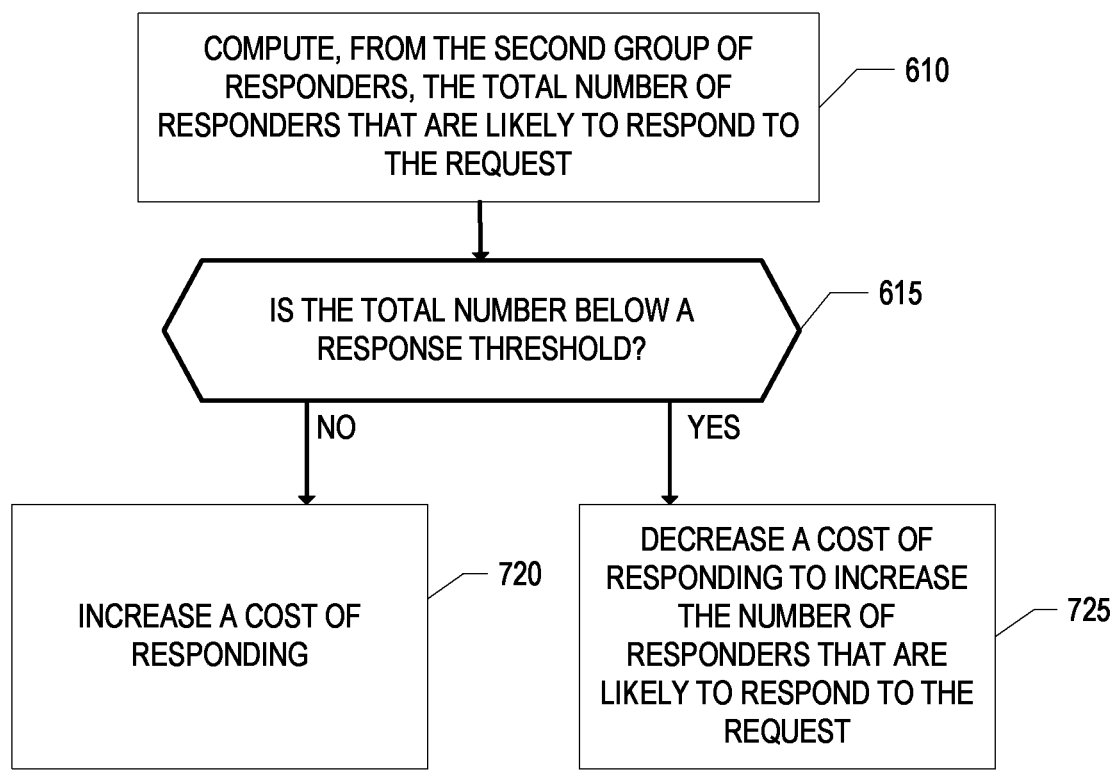
FIG. 7 is a flow diagram that illustrates exemplary operations for influencing the number of responders that are likely to respond to the request according to an embodiment.

Using related categories to increase the number of responders that are likely to respond to the request is performed in one embodiment. In another embodiment, the system may decrease a cost to the responder for responding to the request to increase the number of responders that are likely to respond to the request. For instance, FIG. 7 illustrates exemplary operations for influencing the number of responders that are likely to respond to the request according to an embodiment. The operations 610-615 of FIG. 7 are performed as previously described with respect to FIG. 6. However, if the total number of responders that are likely to respond to the request is below the response threshold, in the embodiment of FIG. 7, operation flows to operation 725 where the cost to the responders for responding to the request is decreased to increase the number of responders that are likely to respond to the request. The amount that the cost is adjusted may be determined through price sampling and potentially A/B testing, and may depend on the extent to which the total number is below the threshold. The amount that the cost is adjusted may be different for different service categories.

If the total number of responders that are likely to respond to the request is above the response threshold, which indicates a high supply, in the embodiment of FIG. 7, operation flows to operation 720 and the cost to the responders for responding to the request is increased. The amount that the cost is adjusted may be determined through pricing sampling and potentially A/B testing, and may depend on the extent to which the total number is above the threshold. The amount that the cost is adjusted may be different for different service categories.

Figure 8:
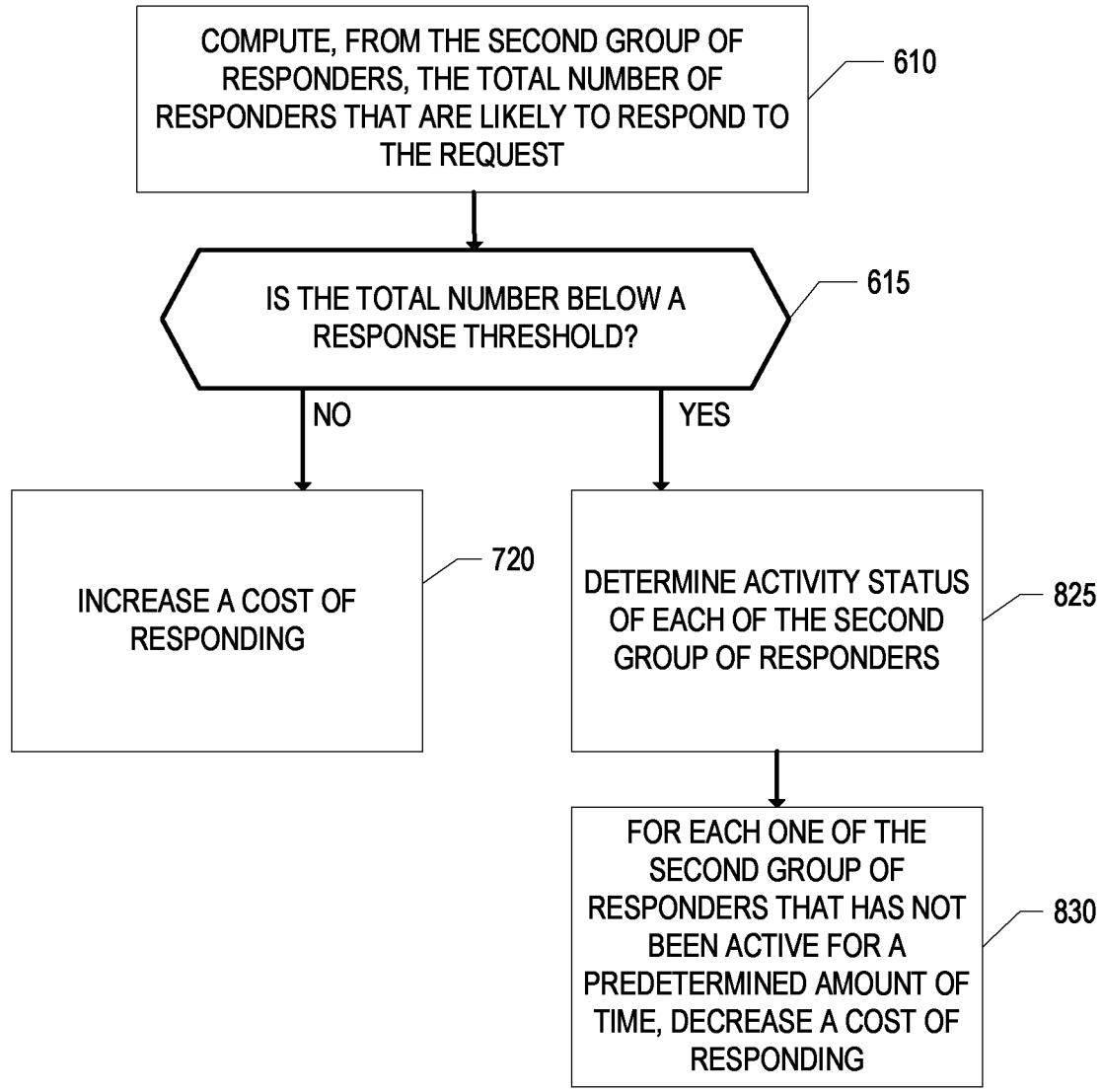
FIG. 8 is a flow diagram that illustrates exemplary operations for influencing the number of responders that are likely to respond to the request according to an embodiment.

In an embodiment, the system may influence the number of responders that are likely to respond to the request by discounting the cost for certain responders (e.g., those that have been inactive for a certain period of time). FIG. 8 is a flow diagram that illustrates exemplary operations for influencing the number of responders that are likely to respond to the request according to an embodiment. The operations 610-615 of FIG. 8 are performed as previously described with respect to FIG. 6, and the operation 720 of FIG. 8 is performed as previously described with respect to FIG. 7. However, if the total number of responders that are likely to respond to the request is below the response threshold, in the embodiment of FIG. 8, operation flows to operation 825 where the selection limiter 154 determines the activity status of each of the second group of responders. The activity status for a responder may include whether the responder is currently actively responding or using the system. Flow then moves to operation 830 where for each responder of the second group of responders that have been determined to not have been active for a predetermined amount of time, a cost to those responders for responding to the request is decreased to increase the number of responders that are likely to respond to the request. The amount that the cost is adjusted may be determined through price sampling and potentially A/B testing, and may depend on the extent to which the total number is below the threshold. The amount that the cost is adjusted may be different for different service categories. The reduced cost for a responder may exist until that responder reaches a condition where they become active again (e.g., sending N responses or getting hired M times).

In some embodiments, responders that have recently registered for the system (e.g., within a predefined period of time such as 30 days) and/or have recently begun offering service for the requested category in the requested location (e.g., within the predefined period of time) are added to the response submission list for the service regardless of their total response submission score.

Referring to FIG. 3, after selecting the second group of responders in operation 340, control moves to operation 345 where the request for service is communicated to each of the selected second group of responders. By way of example, the second group of responders are added to a response submission list and the notification module 162 transmits a message to each of the second group of responders that identifies the request. The message may include the information of the request and/or a notification that a request is available on the server for viewing. The message may be sent through an email, text message, and/or a notification for a native application installed on the responder devices. The message to respond may also be capable of being displayed to the responder upon logging into the service (e.g., in a dashboard for the responder). Any of the second group of responders may then respond to the request.

Automatic Responses

In an embodiment, instead of sending or communicating the request from a requester to a matching responder, a response is automatically generated by the system on behalf of the responder and sent to the requester. In this embodiment, the response is sometimes referred herein as an automatic response. In such an embodiment, the responder provides configuration information such as what requesters they are willing to respond to and the types of jobs that they are willing to accept. The responder may also provide information for automatic generation of the response including their name, type of service they provide, location, travel preferences, profile photo, service description, and other basic information. The responder may provide information about the price they will charge for the service. The responder may provide information regarding the number of requests they can fulfill in a given period of time.

The responder(s) that are selected for automatic generation of responses are selected from many more responders. In an embodiment, the selected responder(s) are selected based on multiple level matching where the first level of matching may be performed based on a set of course features including one or more of category, location, and progress points, and the responder(s) that match these features are referred to as candidate responders. A second level of matching may include computing a score for each candidate responder based on a scoring function and feature data, to determine which responder(s) to select. The selection may be based on machine learning models with heuristics. For instance, in an embodiment, the decision of selecting responder(s) may be based on one or more of the following: a relevance of the responder's response to the requester, maximizing fulfillment of requests, and maximizing an overall aggregate measure of relevance across a plurality of requests.

Figure 9:
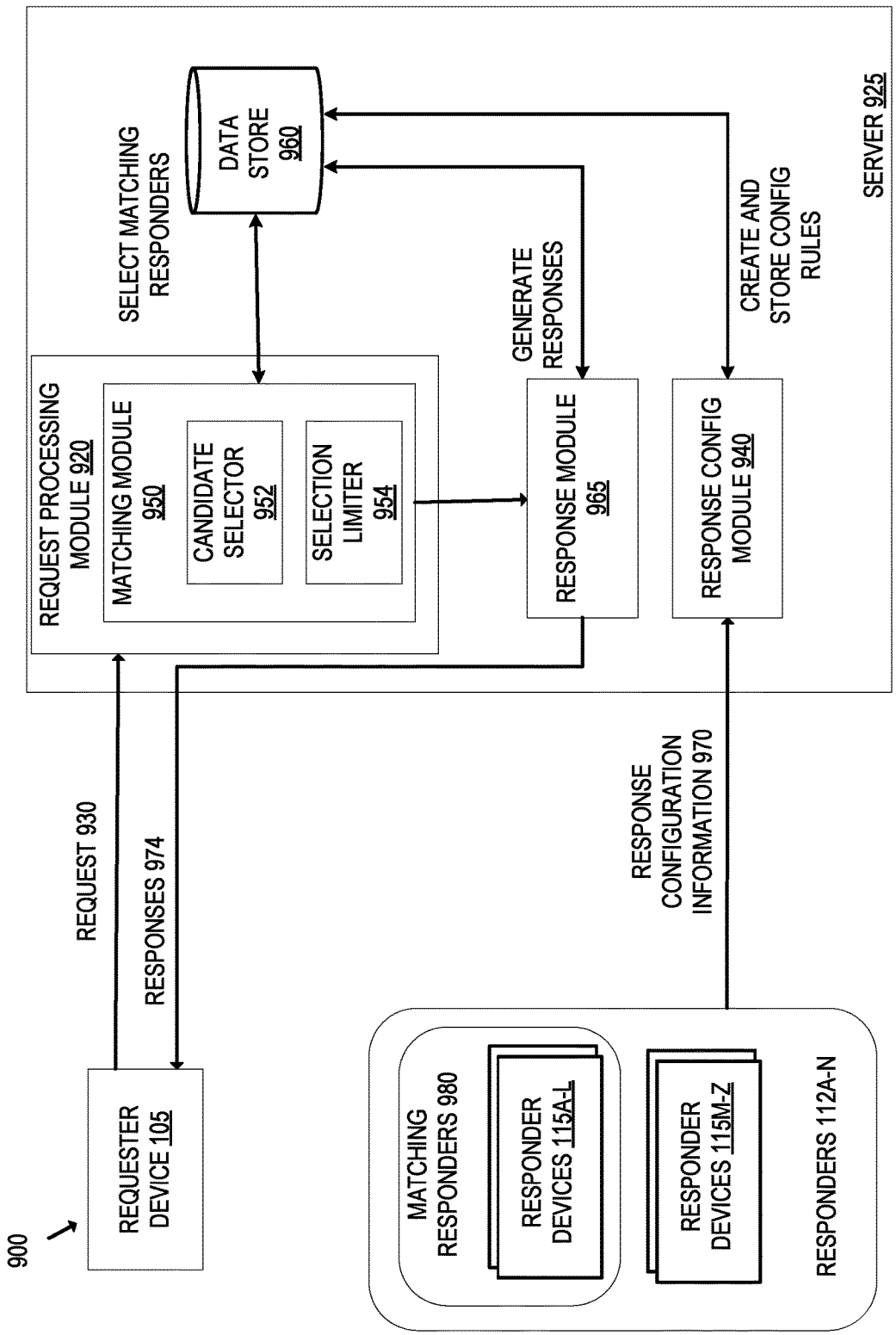
FIG. 9 is a block diagram that illustrates an exemplary architecture for an improved system for matching a request from a user to a set of one or more different users for responding to the request, according to an embodiment.

FIG. 9 is a block diagram that illustrates an exemplary architecture for an improved system for matching a request from a user to a set of one or more different users for responding to the request, according to an embodiment. The system 900 illustrated in FIG. 9 includes the requester device 105, the responder devices 115A-Z, and the server 925. The requester device 105 and the responder devices 115A-Z are similar to that described in FIG. 1. However, the responder devices 115A-Z are configured to provide response configuration information to the server 925, which the server 925 uses to automatically generate response(s) on behalf of the responders 112A-N. The server 925 is a computing device that provides functionality for the improved system for matching requester requests with responders. In the embodiment illustrated in FIG. 9, the server 925 includes the request processing module 920, the response configuration module 940, the response module 965, and the data store 960. The data store 960 stores data related to the responders and the requesters, and is used by the server 925 (e.g., the request processing module 920, the response configuration module 940, and/or the response module 965). The data store 960 may include the same data as the data store 160, in an embodiment. Although illustrated in FIG. 9 as part of the server 925, the data store 960 may be in a separate computing device than the server 925 and queried by the server 925.

The response configuration module 940 is adapted to be used by the responders for configuring automatic generation of a response to a request. The response configuration module 940 may provide an interface (e.g., available as a website or part of a native application) that allows responders to configure and manage (e.g., create, view, edit, delete, modify) rules for the automatic generation of responses to requests. The server 925 receives response configuration information 970 from each of the responders 112A-N, via the response configuration module 940. The response configuration information of a particular responder indicates the type of requesters they are willing to respond to, and/or the type of requests that they are willing to fulfill. The response configuration information from a responder may also include information for automatic generation of the response including their name, type of service they provide, location, travel preferences, profile photo, service description, scheduling information (availability), and other basic information. The response configuration information may include information about the price the responder will charge for the service. The response configuration information may include information regarding the number of requests the responder can fulfill in a given period of time. The response configuration information may be stored in the data store 960.

The request processing module 920 is configured to receive and process requests from requesters. Each request defines the parameters of what is being requested. In a specific embodiment where the request is a request for service, the request defines the type of service requested, the location where the service is desired, a category of the desired service, and one or more request preferences.

The request processing module 920 may select the responder(s) that are eligible for responding to the request. In an embodiment, the request processing module 920 selects, from multiple responders, a set of one or more responders for responding to the request as a result of a matching process performed by the matching module 950. In the example shown in FIG. 9, the responders 980 that operate the responder devices 115A-L have been determined to respond to the request. In the embodiment shown in FIG. 9, the matching module 950 includes the candidate selector 952 and the selection limiter 954. The candidate selector 952 performs a first level of matching based on a set of one or more course features including one or more of requested category, requested location, and progress points, to find the responder(s) that match these features. There may be many responders that match based on the first level of matching. In an embodiment, the first level of matching is similar or the same as the first level of matching as described with respect to the embodiment of FIGS. 1 and 3.

After the first level of matching is performed, the selection limiter 954 of the matching module 950 performs a second level of matching to refine which of the responder(s) that matched the first level of matching will be selected. The selection limiter 954 may perform the second level of matching based on one or more of the following: a relevance of the responder's response (if given) to the requester, maximizing fulfillment of requests, and maximizing an overall aggregate measure of relevance across a plurality of requests. Like the selection limiter 154, the selection limiter 954 may use a machine learning model with heuristics to perform the second level of matching, such as a logistic regression model. The second level of matching will be described in greater detail with respect to FIGS. 10-11.

The response module 965 is configured to automatically generate a response on behalf of a selected responder, based on the response configuration information received from the responders and the request. The response module 965 is also configured to communicate the generated response to the requesting device. Instead of sending the request from a requester to a matching responder, a response is automatically generated by the system on behalf of the responder and communicated to the requester. The responses 974 are communicated to the requester device 105.

Figure 10:
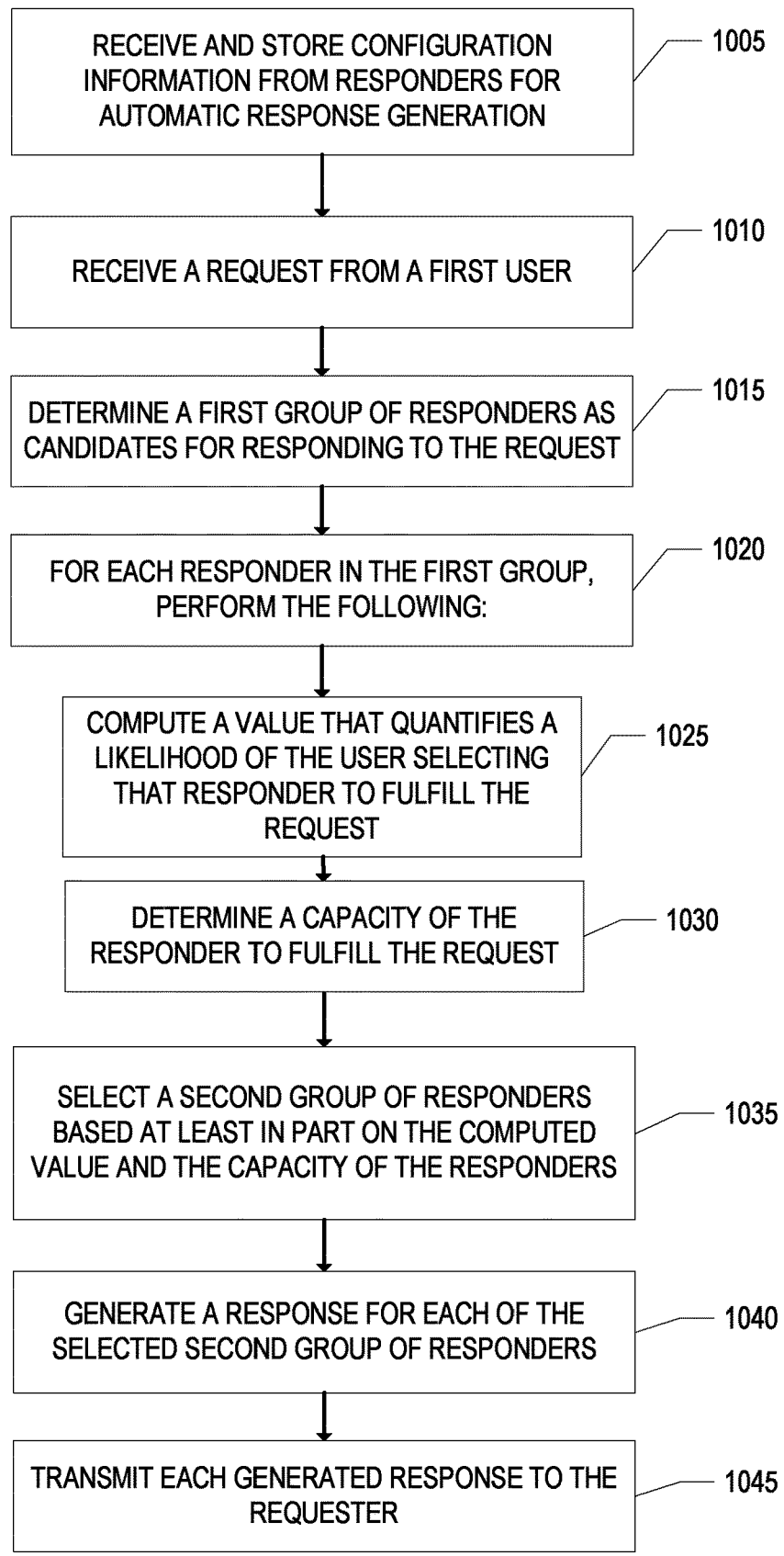
FIG. 10 is a flow diagram that illustrates exemplary operations for matching a request from a user to a set of one or more different users for responding to the request according to an embodiment.

FIG. 10 is a flow diagram that illustrates exemplary operations for matching a request from a user to a set of one or more different users for responding to the request according to an embodiment. The operations of FIG. 10 will be described with respect to the exemplary embodiment of FIG. 9. However, the operations of FIG. 10 can be performed by different embodiments than those discussed with FIG. 9, and the exemplary embodiment of FIG. 9 can perform different embodiments than those discussed with respect to FIG. 10.

At operation 1005, the response configuration module 940 receives and stores the configuration information 970 for configuring automatic response generation on behalf of a responder. The received configuration information 970 is used by the response configuration module 940 to configure rules for generating responses on behalf of the responder. For instance, in an embodiment where the response is generated in reply to a request for service, the configuration information 970 may specify one or more of: the type of requesters they are willing to respond to, and/or the type of requests that they are willing to fulfill. The response configuration information from a responder may also include information for automatic generation of the response including their name, type of service they provide, location, travel preferences, profile photo, service description, scheduling information (availability), and other basic information. The response configuration information may include information about the price the responder will charge for the service. The response configuration information may include information regarding the number of requests the responder can fulfill in a given period of time. The response configuration information may be stored in the data store 960.

At operation 1010, the request processing module 920 of the server 925 receives a request 930 from a first user. The request may be a request for service and define parameters for the requested service. The request may be similar to that as described with respect to operation 310 of FIG. 3. In an embodiment, the request 930 specifies that the requester wishes to receive responses that have been automatically generated (as opposed to being manually generated). Thus, instead of having to wait to receive a response that is largely manually generated, the requester can receive responses much more quickly because they have been automatically generated. This leads to higher engagement rates of the requester since they can determine whether to act upon the response in a shorter timeframe. This in turn leads to higher chances of a responder being selected to fulfill the request, and a faster process to get the request fulfilled.

The matching module 950 of the server 925 performs a first level of matching to determine a first group of responders as candidates for responding to the request. In a case where the request is for service and includes a requested location and category, the matching module 950 determines the first group of responders to be those that match the requested location and category. Thus, at operation 1015, the candidate selector 952 of the matching module 950 determines a first group of responders as candidates for responding to the request. In the case where the request is for service and defines a requested location and category the candidate selector 952 determines the first group of responders as those responders that match the requested location and category, which are sometimes referred to as candidate responders. The matching module 950 accesses information about the responders such as the location(s) that they offer service and the categor(ies) of service that they offer from the data store 960. The candidate selector 952 compares the requested location and category with the information from the data store 960 to select the candidate responders. Depending on the location and/or category, there may be many candidate responders. Flow moves from operation 1015 to operation 1020.

After determining the candidate responders, the matching module 950 of the server 925 performs a second level of matching to refine which responders are selected for automatic response generation. The second level of matching is intended to determine which set of responders are best suited for fulfilling the request, and may take the following factors into consideration: the requester's requirements included in the request, the responder's express intent and derived interest in fulfilling the request, the qualification of the responder for fulfilling the request, whether the responder is a good fit for the request (e.g., for request for services involving personal preferences or style, such as interior design jobs), whether the request is a good fit for the responder and is likely to deliver value to the responder's business, maximizing fulfillment of requests, and/or maximizing an overall aggregate measure of relevance across a plurality of requests. At operation 1020, the selection limiter 954 of the matching module 950 performs operations 1025-1030 for each responder in the first group of responders (the candidate responders).

At operation 1025, the selection limiter 954 computes a value that quantifies a likelihood of the requester selecting that responder to fulfill the request, if a response was given from that requester. The computation of this value may be based on the estimated quality of the responders to the requester and may use a logistic regression model. By way of example, the logistic regression model may use one or more signals derived from data of the system including reviews of the responders, non-review related profile features, response time of the responders, previous request fulfillment rate of the responders, distance between the requested location and the responder, non-responder-specific features, and/or information from the perspective response itself such as the price that would be offered to fulfill the request.

Through an empirical data analysis, the number of reviews of a responder is correlated with the request fulfillment rate of the responder. Similarly, the rating of the reviews is also correlated with the request fulfillment rate of the responder. To say it another way, responders that have a relatively large number of reviews and are rated relatively high tend to be selected to fulfill requests at a higher rate than responders with a relatively low number of reviews and/or low rating. Moreover, the number of and rating of verified reviews (those that have been verified as coming from a requester that selected the responder to fulfill the request) may correlate with the request fulfillment rate of the responder.

Non-review related profile features of the responder may be correlated with the request fulfillment rate of the responder, such as the existence of a profile picture, the number of profile pictures, the number of videos, profile completion status, the number of times the responder has been selected to fulfill a request, the length of the service description, whether the responder has passed a background check, and/or whether the responder shows proof of being licensed. For instance, responders with profile picture(s) may have a larger request fulfillment rate than those responders that do not have profile picture(s). Also, the number of pictures can have a correlation with request fulfillment rate. For instance, the request fulfillment rate of responders tends to go up until about 5 pictures where the request fulfillment rate levels off. The number of videos of a responder may be correlated with the request fulfillment rate of the responder depending on the category of service provided. Whether a responder has passed a background check may impact request fulfillment rate depending on the service category. For example, responders that have passed a background check may have a larger request fulfillment rate in service categories that concern children (e.g., babysitting, tutoring, music lessons, etc.). Responders that have evidence of being licensed may have a higher request fulfillment rate than other responders in certain categories (e.g., wellness, personal, pets).

The response time of a responder is correlated with the request fulfillment rate. For instance, how quickly the responder responds to messages or questions from a requester impacts the request fulfillment rate. That is, responders that respond more quickly have a higher request fulfillment rate than other responders. The response time may be weighed more heavily in recent time windows and/or only viewed in a certain time window. For instance, the average response time in the past year (or other predefined time period) may be used.

The previous request fulfillment rate is generally correlated with the current request fulfillment rate. That is, the request fulfillment rate of responders for a service category generally tends to stay roughly linear. The number of previous times a responder has been selected to fulfill a request over a given time period (e.g., over the last year) may be used.

The distance between the requested location and the responder may impact request fulfillment rate. For instance, request fulfillment rate for a responder generally goes down as distance increases. This value may be dependent on whether the requester travels to the responder for the requested service, whether the responder travels to the requester for the requested service, or whether the requested service is done remotely. In cases where the requester travels to the responder for the requested service, the request fulfillment rate may generally go down as distance increases. In cases where the responder travels to the requester for the requested service, the request fulfillment rate may generally go down as distance increases, but generally not as much as if the requester travelled to the responder. In cases where the requested service may be done remotely, the distance between the requested location and the responder may not impact the request fulfillment rate.

Non-responder-specific features such as the historical request fulfillment rate in the category (across all responders) is generally the same as the expected request fulfillment rate in the category.

Information from the perspective response, such as the price that would be offered to perform the requested service, may also impact the request fulfillment rate. For instance, a responder that is offering a price for the service that is much higher or much lower than other responders in the same category may negatively impact the request fulfillment rate.

Next, at operation 1030, the selection limiter 954 determines a capacity of the responder to fulfill the request. The total capacity may be provided by the responder and monitored by the matching module 950. For instance, the responder may specify how many requests they can fulfill over a period of time (e.g., per day, per week, per month, etc.) and the server may track how many requests the responder has fulfilled and/or agreed to fulfill over that period of time. In an embodiment, the responders are charged when an automatic response is placed on their behalf. In another embodiment, the responders are charged when a requester makes a contact (e.g., sends a message, places a phone call through the platform, etc.) in response to an automatic response being placed on their behalf. In such embodiments, instead of, or in addition to, specifying how many requests a responder can fulfill over a period of time, the responder may specify a response budget that indicates how many responses can be generated on their behalf. The response budget may be an overall budget or may be a recurring budget over a period of time (e.g., a response budget per day, per week, per month, etc.). In an embodiment, the number of responses generated on behalf of a responder over a given time period may be for more requests than that responder has current capacity to fulfill, if it is determined that the responder on average does not typically get selected for every response that is generated. The server tracks the response budget and determines whether the responder has capacity to perform the job. Flow moves from operation 1030 to operation 1035.

At operation 1035, the selection limiter 954 selects a second group of responders based at least in part on the computed value and the capacity of the responders. For instance, the selection limiter 954 may rank the responders that have capacity to fulfil the request by the likelihood of the requester selecting the responder for fulfilling the request, and select the second group of responders according to that ranking. As another example, the selection limiter 954 may distribute the responses across multiple requests and/or expected requests. For instance, the selection limiter 954 may select the members of the second group of responders to maximize the chances to fill all requester requests (existing and expected) over a given period of time (e.g., daily, weekly, monthly). For instance, consider a case where a market has two tutoring responders that can each fulfill one request for tutoring per week where the first responder can tutor math only and the second responder can tutor math and chemistry. If the math tutoring request is fulfilled by the second responder during the week, then there is no one in the market that can fulfill the chemistry request during that week. On the other hand, if the math tutoring request is fulfilled by the first responder during the week, then a chemistry request may be fulfilled by the second responder. As another example, the selection limiter 954 may select the members of the second group of responders to maximize the relevance of the responders' responses to requesters over a longer period of time by forecasting future requester needs and using the forecast to maximize an overall aggregate measure of relevance across many requests (e.g., all requests in a market over a week).

Figure 11:
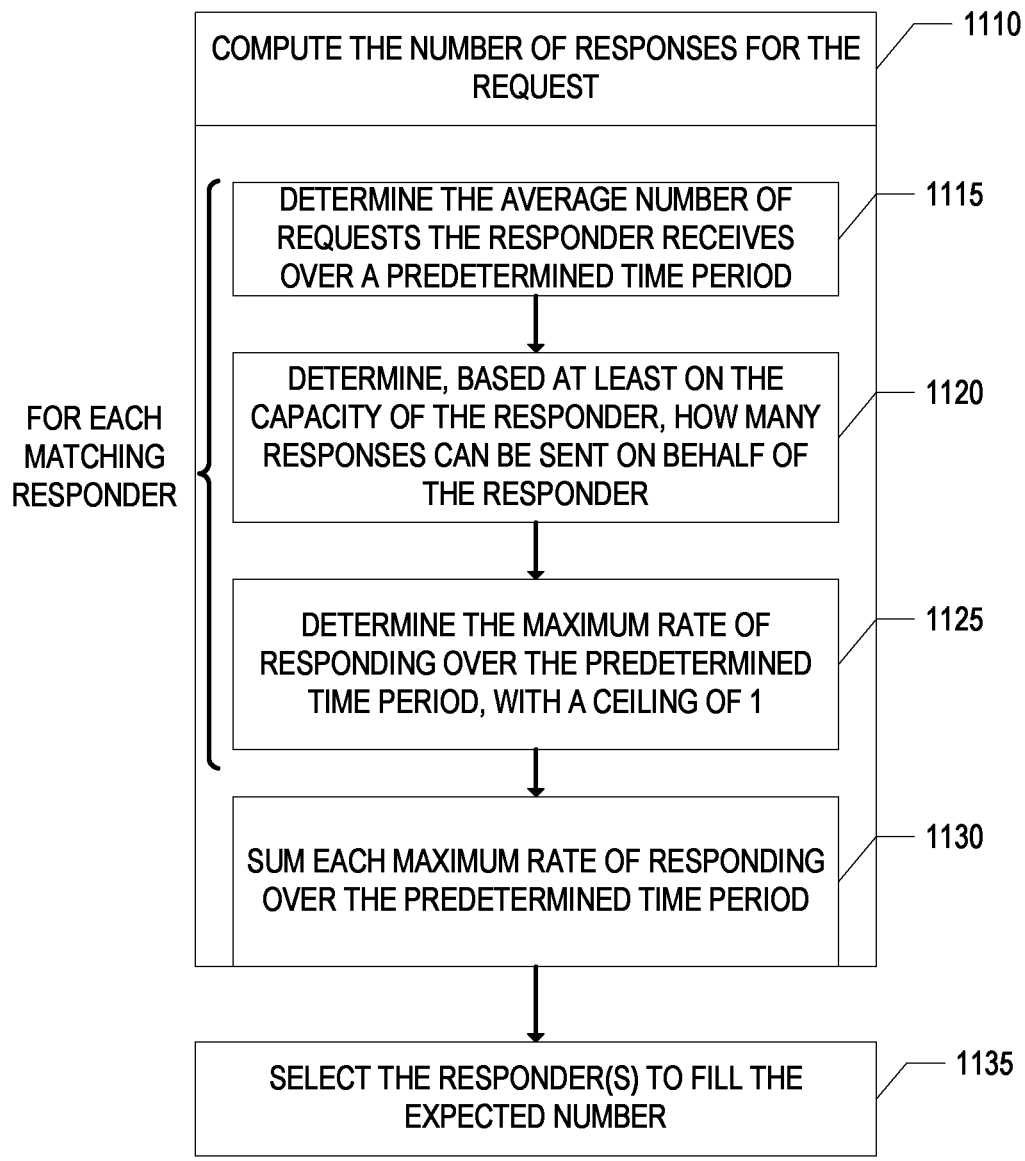
FIG. 11 is flow diagram that illustrates exemplary operations for selecting a second group of responders according to an embodiment.

FIG. 11 is flow diagram that illustrates exemplary operations for selecting a second group of responders according to an embodiment. For instance, the operations of FIG. 11 may be performed during the operation 1035. At operation 1110, the selection limiter 954 computes the number of responses for the request. The number of responses for the request may be determined as a function of the number of responders that are eligible and have capacity for the requested service, the aggregate of the number of fulfillments over responses for the requested category (that is, the average of how many responses turn into fulfillments for the requested category), and the expected number of future requests for the requested category.

In an embodiment, computing the number of responses for the request includes performing operation 1115-1130. The operations 1115-1125 are performed for each responder that matched the first level of matching. At operation 1115, the selection limiter 954 determines the average number of requests the responder receives or has been determined to match (e.g., after the second level of matching) in the requested category over a predetermined time period (e.g., per day, per week, per month, etc.). Next, at operation 1120, the selection limiter 954 determines, based at least on the capacity of the responder, how many responses can be sent on behalf of the responder. As previously described, the number of responses sent on behalf of the responder over a given time period may be higher than the capacity of the responder over that time period. The selection limiter 954 may determine the average rate at which the responder gets selected to fulfill a request over the number of responses sent over the predetermined time period. The maximum number of responses may be set as the capacity of the responder divided by the average request fulfillment rate of the responder. For instance, if the capacity of the responder for a week is 5 fulfillments and the average request fulfillment rate of the responder is 0.5, the maximum number of responses that can be sent on behalf of the responder may be 10. Next, at operation 1125, the selection limiter 954 determines the maximum rate of sending a response over the predetermined time period, with a ceiling of 1. For instance, the maximum rate of sending a response may be calculated as the maximum number of responses over the average number of requests the responder receives over the predetermined time period. For instance, if the responder receives 15 requests on average over the predetermined time period and the maximum number of responses over that time period is calculated to be 10, the maximum rate of sending a response over the time period may be 10/15. Next, at operation 1130, the selection limiter 954 determines the sum of each maximum rate of sending a response for each responder as found in operation 1125. The computed number of responses for the request is based on the sum of each maximum rate. For instance, the computed number of responses may be the sum of the maximum rates rounded down to the nearest integer. As an example, if the sum of the maximum rates is 3.8, the number of responses may be set as 3. As another example, if each responder had a maximum rate of sending a response as 1, the sum of each maximum rate of sending a response would be equal to the number of responders that matched the first level of matching.

In an embodiment, the selection limiter 954 may limit the number of responses to a predefined number (e.g., up to five responses), and/or reserve a number of responses for those responders that have recently registered with the system (e.g., within a predefined period of time such as 30 days) and/or have recently begun offering service for the requested category in the requested location (e.g., within the predefined period of time).

After computing the number of responses for the request, flow moves to operation 1135 where the selection limiter 954 selects the responder(s) to fill the number of responses. The selection of the responders may be based on a ranking of the responders and may be randomized. For instance, the ranking of each responder may be the same as described in operation 1025, and may be weighed based on the maximum rate of sending a response over the predetermined time period found in operation 1125 (e.g., the computed value that quantifies a likelihood of the requesting requester hiring that responder multiplied by the maximum rate of sending a response over the predetermined time period). The resulting values for the responders may be ranked and the responses may be generated for the highest-ranking responders. A weighted random sampling may also be applied to produce randomness, such as according to the A-ES algorithm of Efraimidis and Spirakis.

Referring to FIG. 10, after selecting the second group of responders in operation 1035, flow moves to operation 1040 where the response module 965 automatically generates a response for each of the selected second group of responders. The responses are generated from the response configuration information received from the respective responders. Next, at operation 1045, the generated responses are sent to the requester. In an embodiment, prior to transmitting the generated responses, the generated responses are provided to the responders for review. For instance, a message may be transmitted to the responder (e.g., email, text message, phone call, message within a native application) that indicates that there is a response pending their review. The responder may then adjust the generated response, cancel the response, or approve the response. In another embodiment, the generated responses are automatically sent to the requester on behalf of the responders without the responders reviewing or otherwise approving the generated responses.

Figure 12:
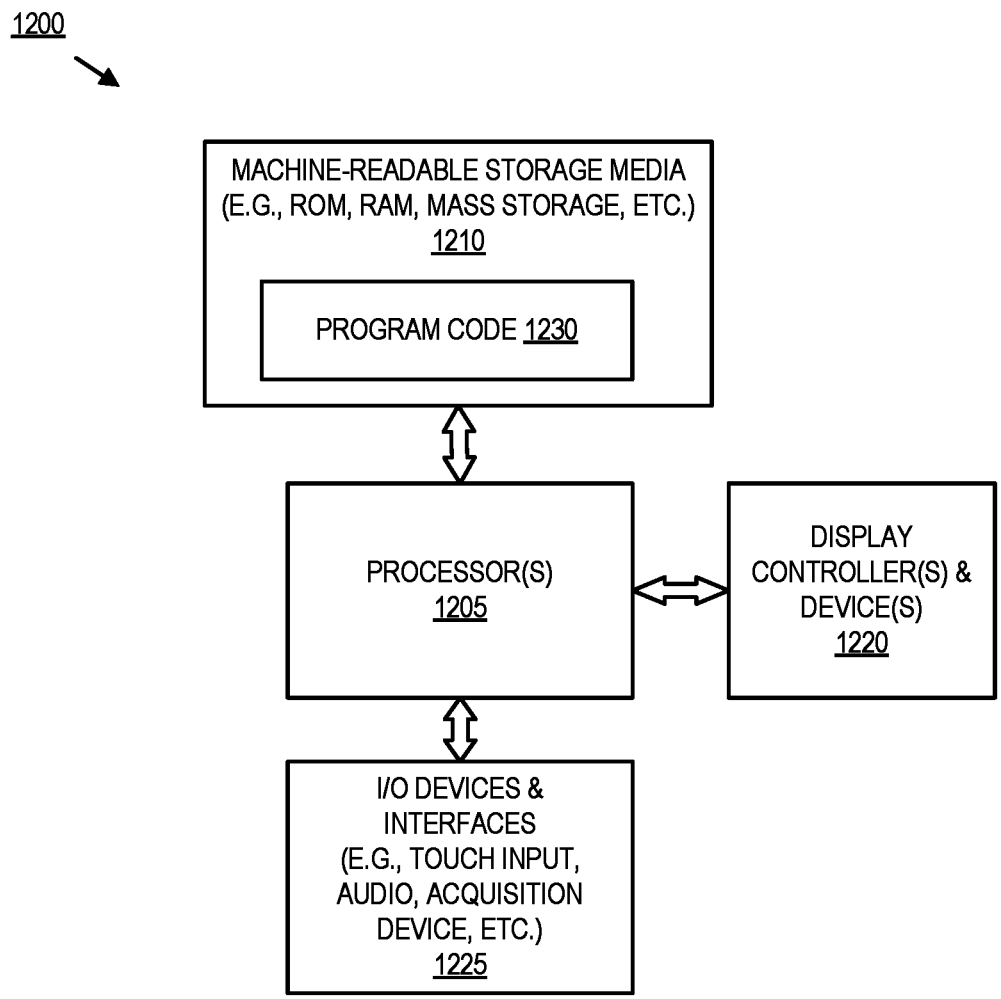
FIG. 12 is a block diagram illustrating an exemplary data processing system that may be used in some embodiments.

FIG. 12 illustrates a block diagram for an exemplary data processing system 1200 that may be used in some embodiments. Data processing system 1200 includes one or more processors 1205 and connected system components (e.g., multiple connected chips). Alternatively, the data processing system 1200 is a system on a chip or Field-Programmable gate array. One or more such data processing systems 1200 may be utilized to implement the embodiments as illustrated in FIGS. 1-12.

The data processing system 1200 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 1210 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 1205. For example, the depicted machine-readable storage media 1210 may store program code 1230 that, when executed by the processor(s) 1205, causes the data processing system 1200 to enable matching a request from a first user to a set of one or more different users as described herein. For example, the program code 1230 may include code for the matching module 150, notification module 162, response module 165, matching module 950, and/or response module 965, which when executed by the processor(s) 1205, causes the data processing system 1200 to perform the operations of the server 125 and/or server 925 described with reference to FIGS. 1-11.

The data processing system 1200 may also include a display controller and display device 1220 to provide a visual user interface, e.g., GUI elements or windows. The visual user interface may be used to enable a requester to submit a request, a responder to review and/or respond to a request, or other task as described herein. The data processing system 1200 also includes one or more input or output ("I/O") devices and interfaces 1225, which are provided to allow a user to provide input to, receive output from, and otherwise transfer data to and from the system. These I/O devices 1225 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 1205, playing audio notifications, etc.), other known I/O devices or a combination of such I/O devices. The I/O devices and interfaces 1225 may also include a connector for a dock or a connector for a USB interface, FireWire, Thunderbolt, Ethernet, etc., to connect the system 1200 with another device, external component, or a network. Exemplary I/O devices and interfaces 1225 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1200 with another device, external component, or a network and receive stored instructions, data, tokens, etc. It will be appreciated that one or more buses may be used to interconnect the various components shown in FIG. 12.

It will be appreciated that additional components, not shown, may also be part of the system 1200, and, in certain embodiments, fewer components than that shown in FIG. 12 may also be used in a data processing system 1200.

The techniques shown in the figures can be implemented using code and data stored and executed on one or more electronic devices (e.g., a requester device, a responder device, and a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server for automatically generating a response to a request received from a first user, comprising:
  receiving response configuration information from each of a first plurality of second users, wherein the received response configuration information includes for each of the first plurality of second users:
    information indicating a type of request in which that second user is willing to fulfill, and
    information indicating a number of requests that second user can fulfill in a given period of time;
  receiving, at the server, the request from the first user, wherein the request includes a location where the request is to be fulfilled and a request type;
  performing a first stage of matching that includes determining a second plurality of second users that match the location and the request type;
  performing a second stage of matching that includes, for each of the second plurality of second users that match the location and category, performing the following:
    computing a value that quantifies a likelihood of the first user selecting that second user to fulfill the request, and
    determining a capacity of the second user to fulfill the request based at least in part on the number of requests that the second user can fulfill in the given period of time;
  selecting a third plurality of second users based at least in part on the computed value and the determined capacity of each of the second plurality of second users, wherein the third plurality of second users is less than the second plurality of second users;
  automatically generating a response to the request for each of the selected third plurality of second users; and
  transmitting each generated response to the first user.

2. The method of claim 1, wherein computing the value that quantifies the likelihood of the first user selecting that second user to fulfill the request includes using a logistic regression model that uses a set of one or more signals including one or more of the following:
  reviews of that second user,
  response time of that second user,
  previous request fulfillment rate of that second user, and
  distance between the first user and that second user.

3. The method of claim 1, wherein determining the capacity of the second user to fulfill the request further includes determining how many requests over the given time period the second user has fulfilled and how many requests the second user has agreed to fulfill or selected to fulfill.

4. The method of claim 1, wherein selecting the third plurality of second users based at least in part on the computed value and the determined capacity of each of the second plurality of second users includes performing the following:

computing a number of responses to send for the request, wherein computing the number of responses to send for the request includes performing the following:

for each of the second plurality of second users that match the location and category, performing the following:

determining an average number of requests that second user receives or has been determined to match in the category over a predetermined time period, determining, based at least in part on the determined capacity of the second user to fulfill the request, a number of responses that can be sent on behalf of the second user over the predetermined time period, and determining a maximum rate of sending a response over the predetermined time period based on the determined average number of requests that second user receives or has been determined to match in the category over the predetermined time period and the determined number of responses that can be sent on behalf of the second user over the predetermined time period;

determining a sum of the maximum rate of each of the second plurality of second users; and wherein the computed number of responses to send for the request is based at least in part on the determined sum of the maximum rate of each of the second plurality of second users.

5. The method of claim 4, wherein a number of the second plurality is equal to the computed number of responses to send for the request.

6. The method of claim 1, wherein transmitting each generated response to the first user is performed automatically.

7. The method of claim 1, wherein prior to transmitting each generated response to the first user, transmitting each generated response to each of the selected third plurality of second users respectively for approval.

8. A non-transitory machine-readable storage medium that provides instructions that, when executed by a processor in a server, causes the processor to perform operations for automatically generating a response to a request received from a first user, the operations comprising:

receiving response configuration information from each of a first plurality of second users, wherein the received response configuration information includes for each of the first plurality of second users:

information indicating a type of request in which that second user is willing to fulfill, and information indicating a number of requests that second user can fulfill in a given period of time;

receiving, at the server, the request from the first user, wherein the request includes a location where the request is to be fulfilled and a request type;

performing a first stage of matching that includes determining a second plurality of second users that match the location and the request type;

performing a second stage of matching that includes, for each of the second plurality of second users that match the location and category, performing the following:

computing a value that quantifies a likelihood of the first user selecting that second user to fulfill the request, and determining a capacity of the second user to fulfill the request based at least in part on the number of requests that the second user can fulfill in the given period of time;

selecting a third plurality of second users based at least in part on the computed value and the determined capacity of each of the second plurality of second users, wherein the third plurality of second users is less than the second plurality of second users;

automatically generating a response to the request for each of the selected third plurality of second users; and transmitting each generated response to the first user.

9. The non-transitory machine-readable storage medium of claim 8, wherein computing the value that quantifies the likelihood of the first user selecting that second user to fulfill the request includes using a logistic regression model that uses a set of one or more signals including one or more of the following:

reviews of that second user, response time of that second user, previous request fulfillment rate of that second user, and distance between the first user and that second user.

10. The non-transitory machine-readable storage medium of claim 8, wherein determining the capacity of the second user to fulfill the request further includes determining how many requests over the given time period the second user has fulfilled and how many requests the second user has agreed to fulfill or selected to fulfill.

11. The non-transitory machine-readable storage medium of claim 8, wherein selecting the third plurality of second users based at least in part on the computed value and the determined capacity of each of the second plurality of second users includes performing the following:

computing a number of responses to send for the request, wherein computing the number of responses to send for the request includes performing the following:

for each of the second plurality of second users that match the location and category, performing the following:

determining an average number of requests that second user receives or has been determined to match in the category over a predetermined time period, determining, based at least in part on the determined capacity of the second user to fulfill the request, a number of responses that can be sent on behalf of the second user over the predetermined time period, and determining a maximum rate of sending a response over the predetermined time period based on the determined average number of requests that second user receives or has been determined to match in the category over the predetermined time period and the determined number of responses that can be sent on behalf of the second user over the predetermined time period;

determining a sum of the maximum rate of each of the second plurality of second users; and wherein the computed number of responses to send for the request is based at least in part on the determined sum of the maximum rate of each of the second plurality of second users.

12. The non-transitory machine-readable storage medium of claim 11, wherein a number of the second plurality is equal to the computed number of responses to send for the request.

13. The non-transitory machine-readable storage medium of claim 8, wherein transmitting each generated response to the first user is performed automatically.

14. The non-transitory machine-readable storage medium of claim 8, wherein the operations further comprise: prior to transmitting each generated response to the first user, transmitting each generated response to each of the selected third plurality of second users respectively for approval.

15. A server, comprising:
a processor; and
a non-transitory machine-readable storage medium coupled with the processor and provides instructions that, when executed by the processor, causes the processor to perform operations for automatic generation of a response to a request received from a first user, the operations to include:
receive response configuration information from each of a first plurality of second users, wherein the received response configuration information is to include for each of the first plurality of second users:
information indicating a type of request in which that second user is willing to fulfill, and
information indicating a number of requests that second user can fulfill in a given period of time;
receive, at the server, the request from the first user, wherein the request is to include a location where the request is to be fulfilled and a request type;
perform a first stage of matching that includes determining a second plurality of second users that match the location and the request type;
perform a second stage of matching that includes, for each of the second plurality of second users that match the location and category, performance of the following:
compute a value that quantifies a likelihood of the first user selecting that second user to fulfill the request, and
determine a capacity of the second user to fulfill the request based at least in part on the number of requests that the second user can fulfill in the given period of time;
select a third plurality of second users based at least in part on the computed value and the determined capacity of each of the second plurality of second users, wherein the third plurality of second users is less than the second plurality of second users;
automatically generate a response to the request for each of the selected third plurality of second users; and
transmit each generated response to the first user.

16. The server of claim 15, wherein computation of the value that quantifies the likelihood of the first user selecting that second user to fulfill the request includes use of a logistic regression model that uses a set of one or more signals including one or more of the following:
reviews of that second user,
response time of that second user,
previous request fulfillment rate of that second user, and
distance between the first user and that second user.

17. The server of claim 15, wherein determination of the capacity of the second user to fulfill the request further includes a determination of how many requests over the given time period the second user has fulfilled and how many requests the second user has agreed to fulfill or selected to fulfill.

18. The server of claim 15, wherein selection of the third plurality of second users based at least in part on the computed value and the determined capacity of each of the second plurality of second users includes performance of the following:
compute a number of responses to send for the request, wherein computation of the number of responses to send for the request includes performance of the following:
for each of the second plurality of second users that match the location and category, perform the following:
determine an average number of requests that second user receives or has been determined to match in the category over a predetermined time period,
determine, based at least in part on the determined capacity of the second user to fulfill the request, a number of responses that can be sent on behalf of the second user over the predetermined time period, and
determine a maximum rate of sending a response over the predetermined time period based on the determined average number of requests that second user receives or has been determined to match in the category over the predetermined time period and the determined number of responses that can be sent on behalf of the second user over the predetermined time period;
determine a sum of the maximum rate of each of the second plurality of second users; and
wherein the computed number of responses to send for the request is based at least in part on the determined sum of the maximum rate of each of the second plurality of second users.

19. The server of claim 18, wherein a number of the second plurality is equal to the computed number of responses to send for the request.

20. The server of claim 15, wherein transmission of each generated response to the first user is to be performed automatically.

21. The server of claim 15, wherein the operations further comprise: prior to transmission of each generated response to the first user, transmit each generated response to each of the selected third plurality of second users respectively for approval.

22. The method of claim 1, wherein the request specifies that any responses directed to the first user be automatically generated as opposed to being manually generated.

23. The non-transitory machine-readable storage medium of claim 8, wherein the request specifies that any responses directed to the first user be automatically generated as opposed to being manually generated.

24. The server of claim 15, wherein the request specifies that any responses directed to the first user be automatically generated as opposed to being manually generated.

* * * * *